(12) United States Patent
Marc

(10) Patent No.: US 8,602,927 B2
(45) Date of Patent: Dec. 10, 2013

(54) GAME BALL AND METHOD OF MANUFACTURING SAME

(75) Inventor: Michel Marc, Lenexa, KS (US)

(73) Assignee: Vertex L.L.C., Lenexa, KS (US)

( * ) Notice: Subject to any disclaimer, the term of this patent is extended or adjusted under 35 U.S.C. 154(b) by 147 days.

(21) Appl. No.: 12/980,868

(22) Filed: Dec. 29, 2010

(65) Prior Publication Data

US 2012/0172160 A1   Jul. 5, 2012

(51) Int. Cl.
*A63B 41/00*   (2006.01)

(52) U.S. Cl.
USPC .......................................... 473/605; 473/607

(58) Field of Classification Search
USPC ........................... 473/603–605, 607, 598, 599
See application file for complete search history.

(56) References Cited

U.S. PATENT DOCUMENTS

| | | | |
|---|---|---|---|
| 4,241,118 A | 12/1980 | Skelton et al. | |
| 4,268,238 A | 5/1981 | Marc | |
| 4,542,902 A * | 9/1985 | Massino | 473/602 |
| 5,542,662 A * | 8/1996 | Kouzai et al. | 473/605 |
| 5,580,049 A | 12/1996 | Brantley | |
| 5,709,623 A * | 1/1998 | Schwaner | 473/604 |
| D405,486 S * | 2/1999 | Chan | D21/713 |
| 6,302,815 B1 * | 10/2001 | Shishido et al. | 473/604 |
| D473,275 S * | 4/2003 | Gundra | D21/713 |
| 6,645,100 B2 | 11/2003 | Guenther et al. | |
| 6,685,585 B2 | 2/2004 | Shishido et al. | |
| 6,971,965 B1 | 12/2005 | Shishido | |
| 6,988,969 B2 * | 1/2006 | Avis | 473/599 |
| 2003/0064839 A1 | 4/2003 | Guenther et al. | |
| 2006/0229150 A1* | 10/2006 | Ou | 473/604 |
| 2007/0004542 A1 | 1/2007 | Park | |
| 2007/0105669 A1 | 5/2007 | Maziarz | |
| 2008/0139349 A1 | 6/2008 | Ou | |
| 2008/0305900 A1 | 12/2008 | Geisendorfer | |
| 2009/0011878 A1* | 1/2009 | Ou | 473/605 |
| 2009/0105019 A1 | 4/2009 | Keppler et al. | |
| 2009/0107617 A1 | 4/2009 | Ou | |
| 2009/0209374 A1 | 8/2009 | Ou | |
| 2009/0325744 A1 | 12/2009 | Raynak et al. | |
| 2009/0325747 A1* | 12/2009 | Ou | 473/605 |
| 2010/0167850 A1* | 7/2010 | Lin | 473/605 |
| 2010/0255940 A1 | 10/2010 | Nuernberg et al. | |
| 2011/0177895 A1* | 7/2011 | Lin | 473/605 |
| 2012/0052994 A1* | 3/2012 | Su | 473/605 |
| 2012/0142465 A1* | 6/2012 | Berggren et al. | 473/604 |

OTHER PUBLICATIONS

PCT International Search Report and Written Opinion for PCT/US2011/065988 dated Apr. 13, 2012.

* cited by examiner

*Primary Examiner* — Steven Wong
(74) *Attorney, Agent, or Firm* — Stinson Morrison Hecker LLP

(57) ABSTRACT

A game ball, such as a soccer ball, having a cover comprised of one or more cover panel blanks and one or more reinforcement material blanks, is provided. The cover panel blanks and reinforcement material blanks are heat bonded together so that the free edges and interior panel boundaries of the cover panel blanks are aligned with the reinforcement material blanks.

29 Claims, 20 Drawing Sheets

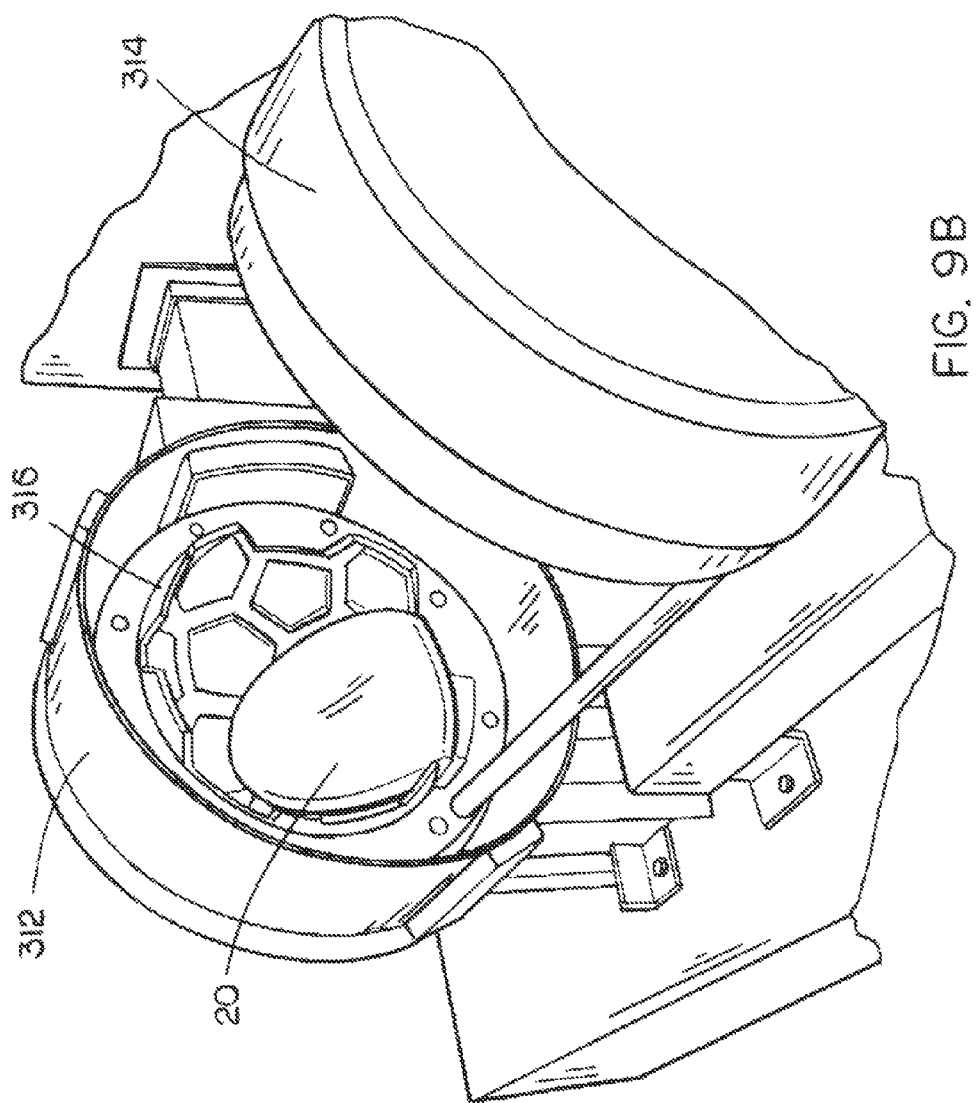

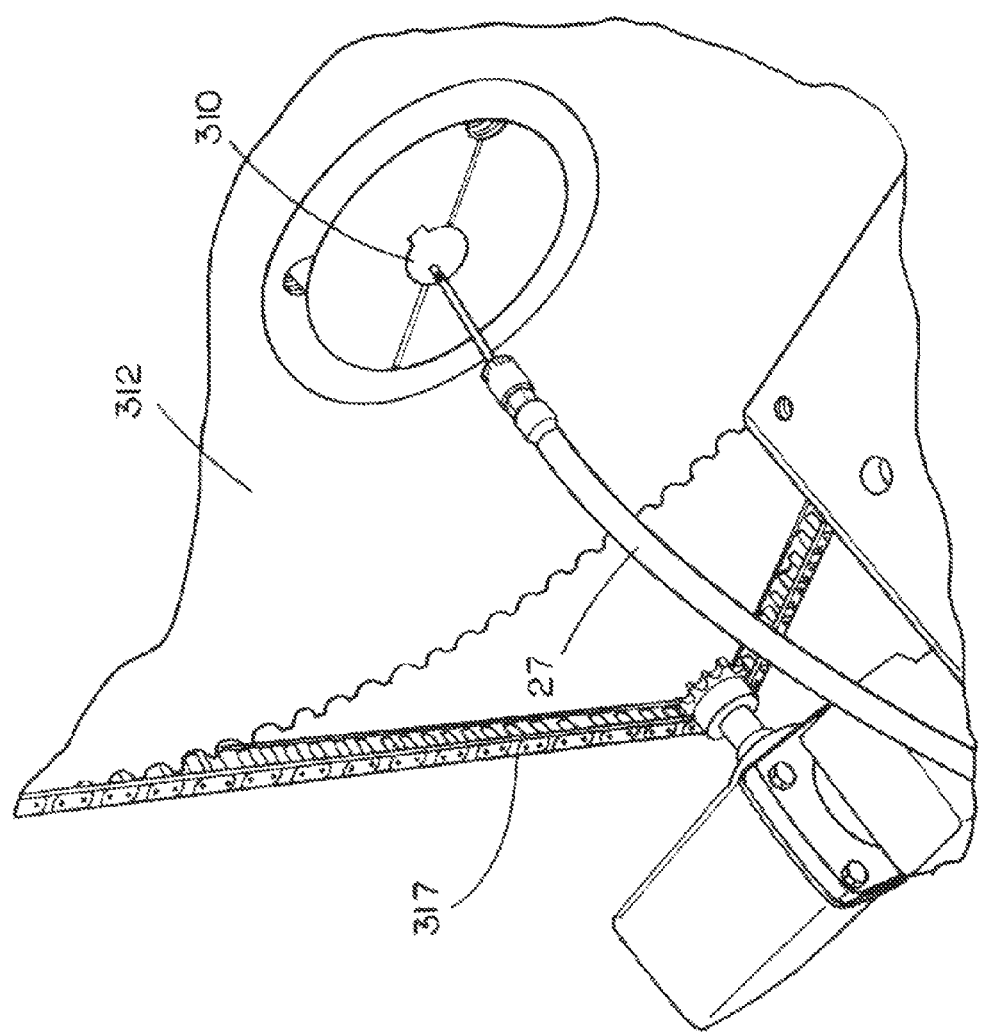

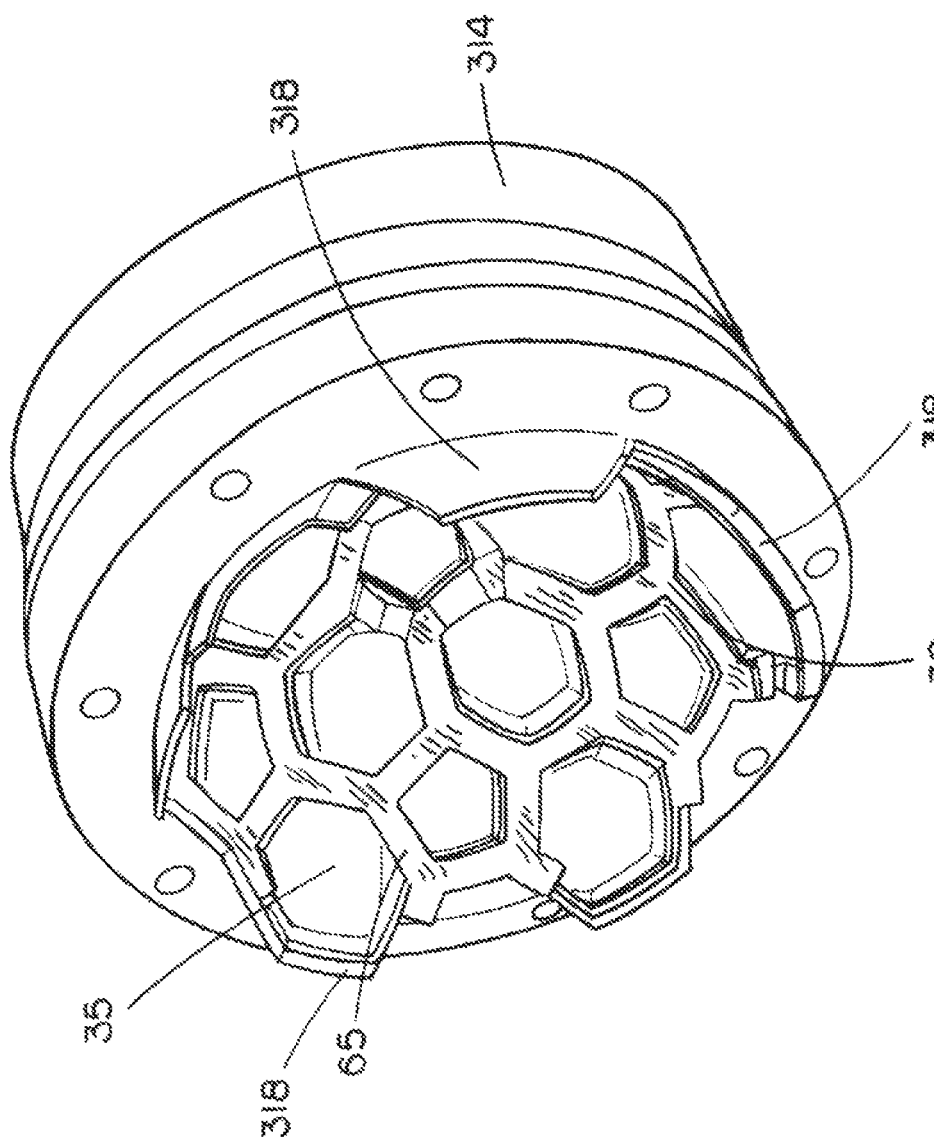

GAME BALL AND METHOD OF MANUFACTURING SAME

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

Many sports balls and game balls include an inflatable bladder and a cover or casing that surrounds the bladder. Such sports balls include, for example, volleyballs, basketballs, footballs, and soccer balls. The cover comprises a plurality of cover panels wherein each of the cover panels is usually stitched to an adjacent cover panel edge-to-edge. The present invention is directed to an improved sports ball in which the cover comprises cover panels reinforced by heat bonding a reinforcement material to the cover panels.

BRIEF SUMMARY OF THE INVENTION

The present invention relates generally to sports balls or game balls, and methods and apparatuses for making the same. In particular, the present invention relates to a sports ball having a multi-paneled cover in which the panels have been heat bonded together without the necessity of stitching. The sports ball comprises a reinforced cover or cover portion formed from a cover panel blank and a reinforcement material blank that have been heated bonded together. The reinforcement material underlies the interior panel boundaries of the panels in the cover material. That is, the reinforcement material is provided along the areas of the cover panel blank such that the reinforcement material mimics a conventional hand-stitched seam on a game ball (e.g., a soccer ball).

In one aspect, the method for manufacturing the sports ball cover or cover portion comprises the steps of providing a cover panel blank having a panel pattern comprising a plurality of panels defined by free edges and interior panel boundaries; providing a reinforcing material blank; and heat bonding the cover panel blank to the reinforcement material blank such that the reinforcing material blank is configured to be aligned with one or more of the free edges and the interior panel boundaries. In another aspect, the cover panel blank comprises six pentagon panels and ten hexagon panels, in still another aspect, the reinforcement material blank comprises a plurality of linked polygon outlines (e.g., five pentagon outlines), wherein each vertice of the polygon outline has a radiating arm extending therefrom. In still another aspect, one of the radiating arms from each pentagon outline has a Y-shaped terminus.

In one aspect, the method for manufacturing the sports ball cover or cover portion involves a heat bonding step which comprises applying an alternating radio frequency electric field to the paneled blank and the reinforcing material blank sufficient to heat bond the cover panel blank and reinforcing material blank together. In another aspect, the frequency of the alternating radio frequency electric field is about 1 MHz to 200 MHz, and the voltage of the alternating radio frequency electric field is about 1,000 V to 10,000 V.

In yet another aspect, the heat bonding step comprises the steps of placing the cover panel blank and the reinforcing material blank in a molding apparatus. The molding apparatus has a mold cavity residing between a first electrode and a second electrode, and the alternating radio frequency electric field is generated between the first and second electrodes.

In still a further aspect, the molding apparatus comprises an outer electrode and an inner electrode, as well as a female ball cover mold and a male ball cover mold between the outer electrode and inner electrode. The female ball cover mold and the male ball cover mold define a molding cavity therebetween. The cover panel blank and the reinforcement material blank are placed in the molding cavity. In a further aspect, the female ball cover mold has a plurality of patterned panel recesses for receiving the panels in the panel pattern of the cover panel blank. The male ball cover mold has a plurality of panel protrusions for receiving the panels in the panel pattern of the cover panel blank and recesses for receiving the reinforcement material blank.

In yet another aspect, the molding apparatus comprises an outer electrode and an inner electrode. The inner electrode is a conductive fluid housed in a bladder. The molding apparatus also comprises an outer mold between the outer electrode and the bladder such that the outer mold and the bladder define a molding cavity therebetween. The cover panel blank and the reinforcement material blank are placed in the molding cavity. In yet another aspect, the outer mold has a plurality of patterned panel recesses for receiving panels in the panel pattern of the cover panel blank. The reinforcement material blank is secured to the cover panel blank or the molding cavity using tape or other adhesive prior to the heat bonding step. After the heat bonding, the conductive fluid is removed from the bladder. In yet another aspect, the bladder is then filled with a gas.

In still a further aspect, the molding apparatus comprises an outer electrode and an inner electrode comprising a bladder having a conductive coating thereon and filled with a gas or liquid. The molding apparatus also comprises an outer mold between the outer electrode and the bladder such that the outer mold and bladder define a molding cavity therebetween. The cover panel blank and the reinforcement material blank are placed in the molding cavity. In still another aspect, the outer mold has a plurality of patterned panel recesses for receiving panels in the panel pattern of the cover panel blank. In still another aspect, the reinforcement material blank is secured to the cover panel blank or the molding cavity using tape or other adhesive prior to the heat bonding step. The bladder is tilled with gas so that it is inflated during the heat bonding step.

In still another aspect, the cover panel blank is formed by placing a cover material in a molding apparatus comprising a first mold and a second mold that together define a paneled sheet molding cavity therebetween. The paneled sheet molding cavity resides between a first electrode and a second electrode. The first mold has a plurality of panel recesses and the second mold has a plurality of panel protrusions. The cover panel blank is formed by applying an alternating radio frequency electric field between the first and second electrodes to form a paneled sheet with the polygon (e.g., hexagon and pentagon) panels contoured and shaped to have the radius of curvature of the final ball, and cutting excess material from the paneled sheet to form the cover panel blank. In another aspect, the frequency of the alternating radio frequency electric field is about 1 MHz to 200 MHz, and the voltage of the alternating radio frequency electric field is about 1,000 V to 10.000 V.

In yet another aspect, the present invention is directed to a sports ball cover or cover portion molding system. The system comprises a first electrode and a second electrode, and a first mold and a second mold. The first mold and the second mold reside between the first electrode and second electrode such that the first mold and the second mold define a molding cavity therebetween. The system includes a cover panel blank having a panel pattern comprising a plurality of panels defined by free edges and interior panel boundaries, and a reinforcement material blank. The cover panel blank and reinforcement material blank reside in the molding cavity. The molding system is used to heat bond the cover panel blank to the reinforcement material blank such that the reinforcing material blank is configured to be aligned with one or more of the free edges and the interior panel boundaries.

In another aspect, the present invention is direct to a method for manufacturing a sports ball cover comprising the steps of forming a first cover portion and a second cover portion, which is preferably hemispherical cover portions. Each of the cover portions is comprised of a cover panel blank that has been heat bonded to a reinforcing material blank. The cover portions are then heat bonded together. In a preferred aspect, each of the hemispherical cover portion comprises a center pentagon panel having five sides, wherein each side of the center pentagon panel is adjacent to a first side of five inner hexagon panels, and wherein a second side of each the five inner hexagon panels is adjacent to a first side of five outer hexagon panels, and wherein a third side of the five inner hexagon panels is adjacent to a first side of five outer pentagon panels. The terminal edges of the first and second hemispherical cover portion each comprise alternating hexagon panels and pentagon panels. The hexagon panels each have a first hexagon panel edge which is completely free of reinforcement material and second and third terminal hexagon panel edges having a portion thereof covered with overlapping reinforcement material from the reinforcement material blank. Each of the pentagon panels have a terminal pentagon panel edge covered with overlapping reinforcement material. In one aspect, the step of heat bonding the first cover portion to the second cover portion comprises the step of aligning the first terminal hexagon panel edges being free of reinforcement material from the first hemispherical cover portion with the terminal pentagon, panel edges covered with overlapping reinforcement material from the second hemispherical cover portion. In another aspect, the step of heat bonding the first cover portion to the second cover portion comprises the step of aligning the second and third terminal hexagon panel edges having a portion thereof covered with overlapping reinforcement material from the first hemispherical cover portion with the second and third terminal hexagon panel edges having a portion thereof covered with overlapping reinforcement material from the second hemispherical cover portion.

The present invention is also directed to a molding apparatus comprising a first outer electrode and second outer electrode such that the first and second electrodes are separated by a dielectric material. The molding apparatus also includes a first mold and a second mold which define a molding cavity. The first cover portion is placed in the first mold, and the second cover portion is placed in the second mold to form overlapping sections between the first cover portion and the second cover portion. The apparatus is then used to heat bond the first cover portion and the second cover portion only in the overlapping sections by applying an alternating electric field between the first outer electrode and second outer electrode.

Additional aspects of the invention, together with the advantages and novel features appurtenant thereto, will be set forth in part in the description which follows, and in part will become apparent to those skilled in the art upon examination of the following, or may be learned from the practice of the invention. The objects and advantages of the invention may be realized and attained by means of the instrumentalities and combinations particularly pointed out in the appended claims.

BRIEF DESCRIPTION OF THE DRAWINGS

FIG. 9A to FIG. 9D illustrate a molding apparatus for joining two ball cover hemispheres (each one-half of the ball) together. FIGS. 9A and 9B illustrate a first hemispherical cover portion of the ball cover and bladder being placed in one of the molds, and FIG. 9C illustrates how the bladder is filled with air from an external tubing with a needle attached to the end of the tubing which is directed through a hole in the mold, preferably in the center of the mold, to engage the air valve in the bladder. FIG. 9D illustrates the second hemispherical cover portion of the ball cover being placed in the other half of the molding apparatus.

FIG. 10A is a cross section of the molding apparatus generally shown in the schematic of FIG. 10B. In addition. FIG. 10A illustrates how the two hemispherical cover portions of the ball are oriented in the molding cavity. It will be appreciated that the line separating the hemispherical cover portions is not drawn in cross-section, but is intended to depict the alignment of the hemispherical cover portions of the ball as generally shown in FIG. 10C.

DETAILED DESCRIPTION OF PREFERRED EMBODIMENTS

Figure 1A:
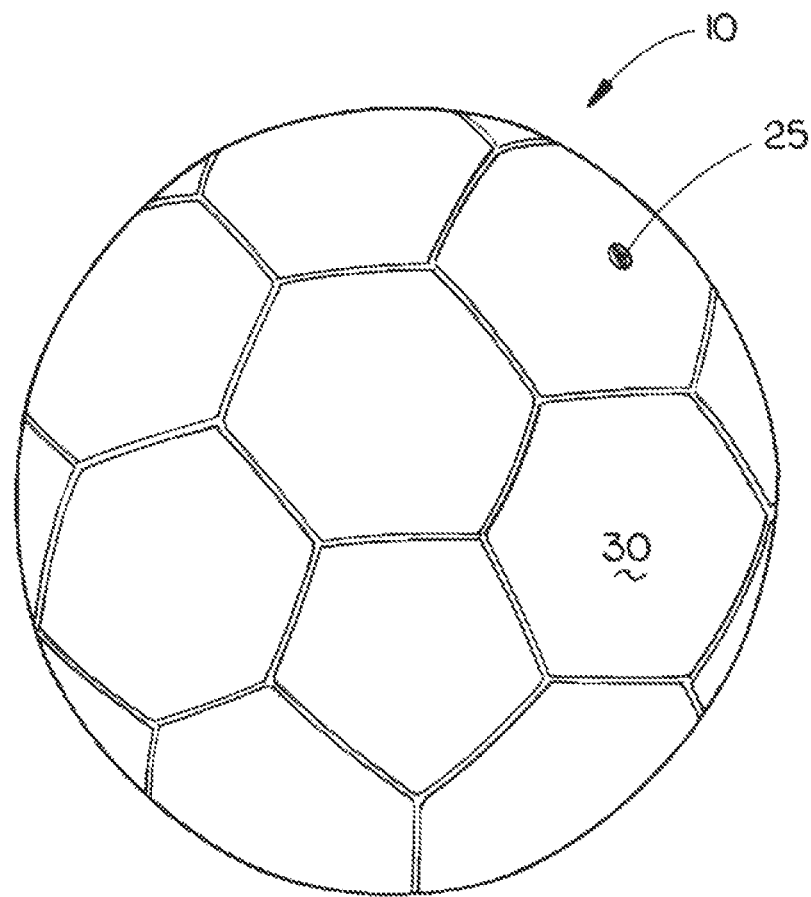
FIG. 1A is a perspective view of a soccer ball made in accordance with the present invention.
Figure 1B:
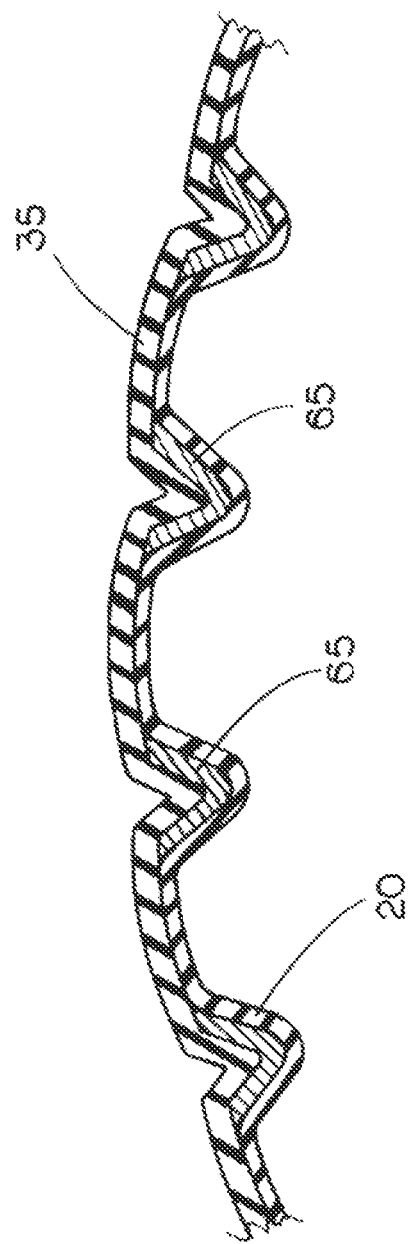
FIG. 1B is a cross-section of a portion of the soccer ball illustrated in FIG. 1A.

The present invention is directed to a sports ball comprising a multi-paneled cover in which one or more sides of the panels are bonded together without the necessity of stitching and reinforced with a reinforcing material located on the interior surface of the panels at the panel boundaries. The cover comprises a cover panel blank that has been heat bonded to a reinforcement material blank.

Referring now to FIGS. 1 to 11, a sports ball 10, such as a soccer ball, according to a preferred embodiment of the present invention is illustrated. As shown in FIGS. 1A and 1B, the sports ball 10 comprises an inflatable bladder 20 having a conventional air valve 25. The sports ball 10 also comprises a reinforced cover 30 formed from one or more cover panel blanks 35 and one or more reinforcement material blanks 65 that have been heat bonded together. The cover panel blank 35 has a panel pattern thereon, for example a panel pattern comprising twelve pentagon panels and twenty hexagon panels in accordance with a typical soccer ball pattern. The panel pattern is defined by interior panel boundaries 43, and the reinforcement material is positioned only along the interior panel boundaries in order to mimic a conventional seam. One or more optional intermediate layers (not shown) may reside between the reinforced cover 30 and bladder 20 as is known to those skilled in the art.

The inflatable bladder 20 is typically made of any flexible material. Exemplary materials include butyl rubber, natural rubber, a combination of butyl and natural rubber, latex, and other elastic materials. In a particularly preferred embodiment, the bladder 20 is made of 80% butyl rubber and 20% natural rubber. The inflatable bladder is adapted to be fully inflated through the air valve 25 to form a substantially spherical shape inside the reinforced cover 30.

The reinforced cover 30 comprises one or more cover panel blanks 35 and one or more reinforcement material blanks 65 that have been heat bonded together. As utilized herein, the term "heat bonding," or variants thereof, is defined as a securing technique between two elements that involves a melting or softening of at least one of the elements such that the materials of the elements are secured to each other when cooled. In general, heat bonding may involve the melting or softening of the cover material and reinforcing material such that the materials are secured together when cooled. Accordingly, heat bonding does not generally involve the use of stitching or adhesives. Rather, the two elements are directly bonded to each other with heat. In some situations, however, stitching or adhesives may be utilized to supplement the joining of elements through heat bonding.

In an exemplary aspect, the reinforced cover 30 comprises two or more cover panel blanks made of cover material. The cover panel blanks are formed from a paneled sheet which comprises a continuous sheet of cover material having a panel pattern as discussed in more detail below. Reinforcement material is applied to the cover panel blanks in order to help heat bond the cover panel blanks together.

The cover material 32 preferably comprises one or more of synthetic leather, thermoplastic urethane, polyurethane, polyvinyl chloride, thermoplastic elastomer, rubber, various other thermoplastic or thermoset materials, or other suitable materials, whether synthetic or natural, that are generally durable and wear-resistant. In some configurations, the cover material may have a layered configuration that combines two or more materials, which are typically co-extruded. For example, an exterior portion of the cover material may be formed from polyurethane or polyvinyl chloride, and an interior portion of the cover material may be formed from a textile element (e.g., woven or non-woven fabric). That is, a textile element which serves as a backing or support may be bonded to the polyurethane or polyvinyl chloride and positioned proximate to the bladder. The cover material typically has a thickness in the range of about 0.5 mm to 4 mm (e.g. about 0.5, 1.0, 1.5, 2.0, 2.5, 3.0, 3.5, or 4.0 mm).

Figure 2:
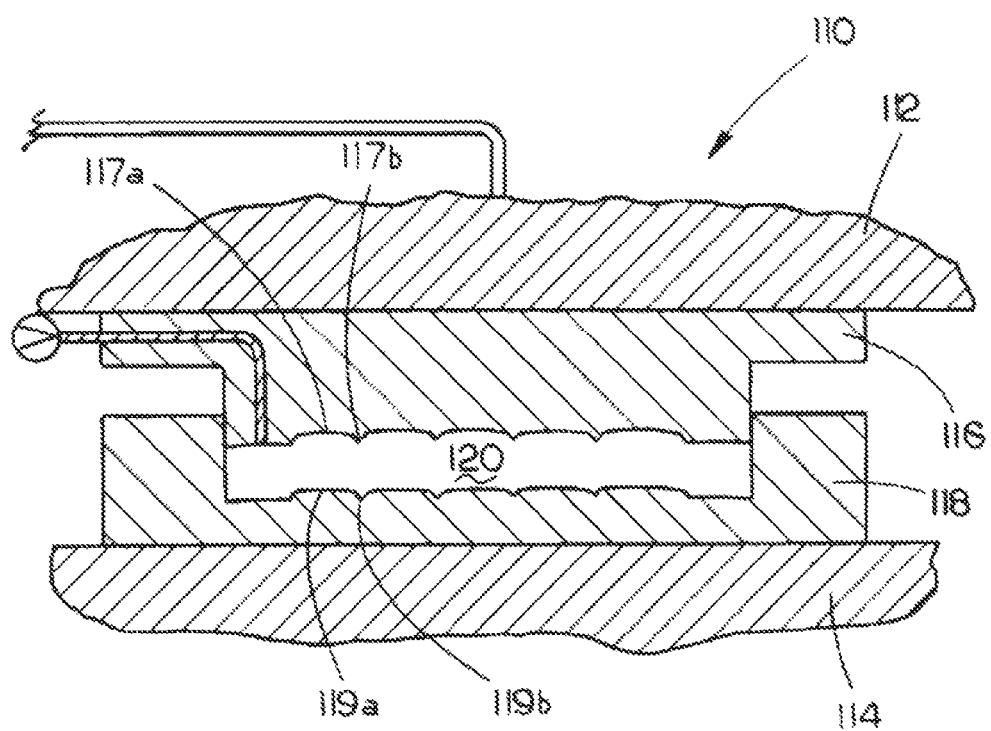
FIG. 2 is a diagram illustrating an exemplary flow molding apparatus for forming the cover panel blank.

In a preferred embodiment, the paneled sheet 37 having the panel pattern 40 is formed from the cover material using a flow molding apparatus. In general, as shown in FIG. 2, the exemplary flow molding apparatus 110 includes a first electrode 112 and a second electrode 114, both of which are connected to an electromagnetic energy source (not shown) operable to generate an alternating radio frequency electric field between the electrodes. The alternating radio frequency electric field may be generated at frequencies ranging from 1 MHz to 500 MHz, is preferably generated at frequencies ranging from 10 MHz to 200 MHz, and is most preferably generated at either 27.12 MHz or 40.68 MHz. Typically, the energy is applied for about 10 to 30 seconds (e.g., about 10, 15, 20, 25, or 30 seconds). Also included within the apparatus are a first mold 116 and a second mold 118 that together define a paneled sheet molding cavity 120 therebetween. The cover material 32 is placed inside the paneled sheet molding cavity 120 in order to mold the cover material 32 into the paneled sheet 37.

Figure 3A:
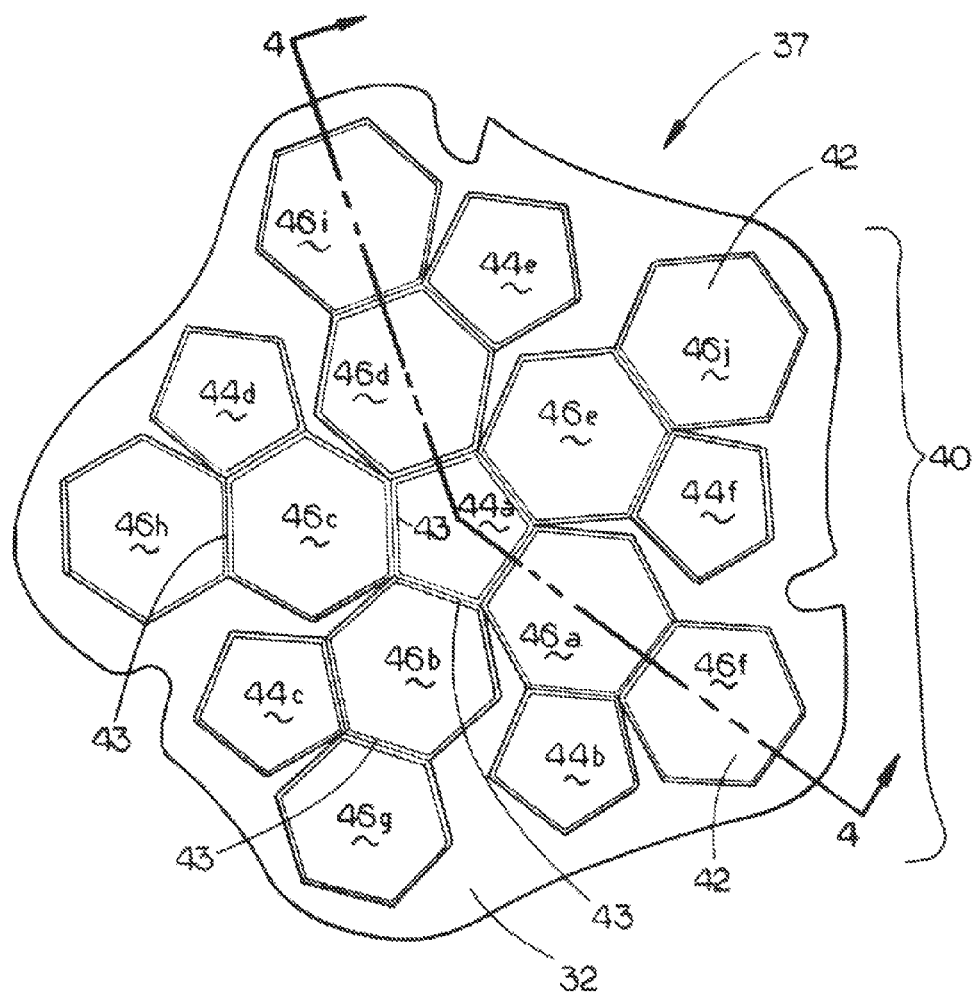
FIG. 3A is a top plan view of an exemplary paneled sheet.
Figure 3B:
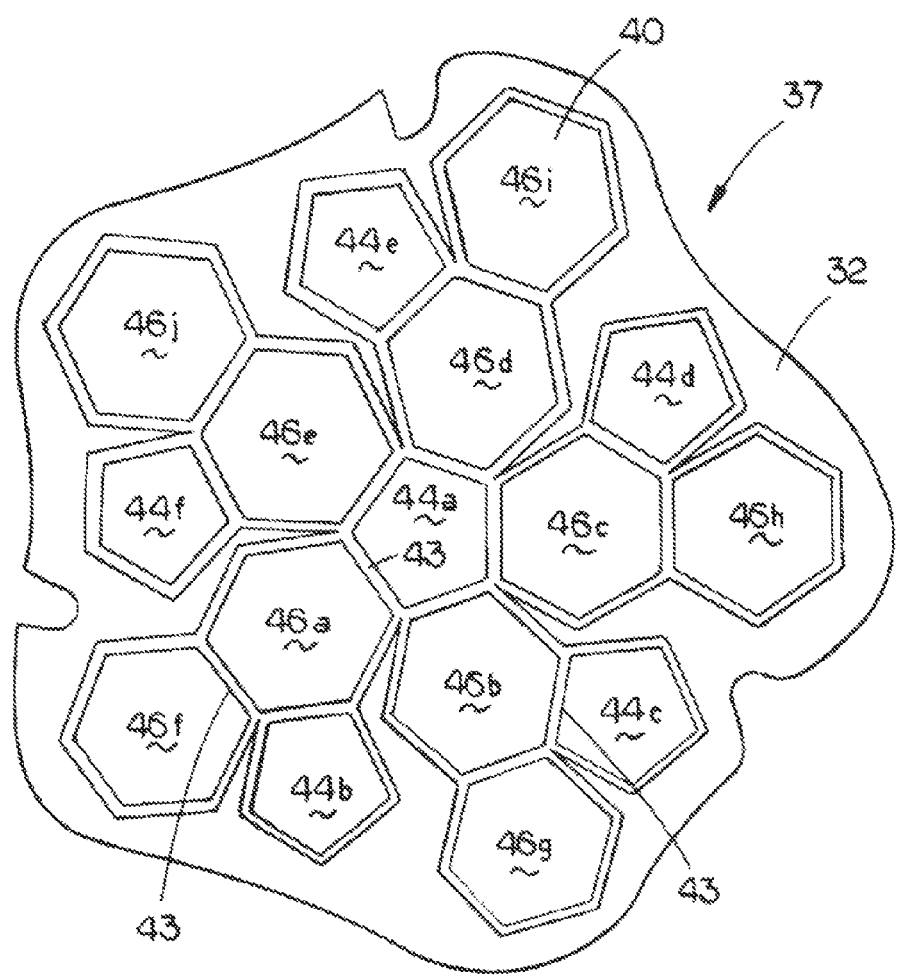
FIG. 3B is a bottom plan view of the paneled sheet.
Figure 4:
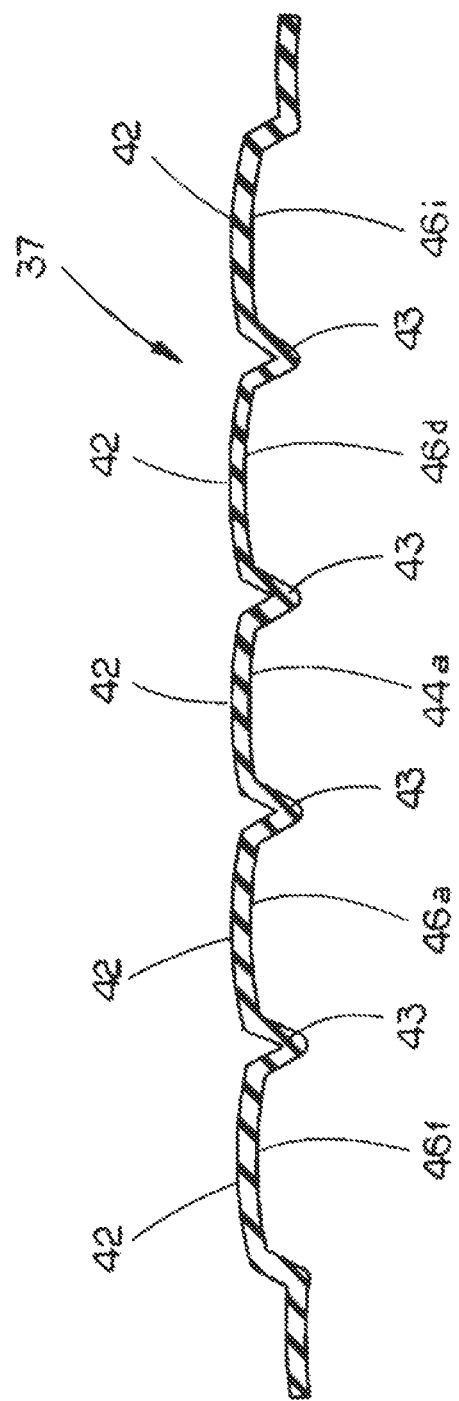
FIG. 4 is a cross-section of the paneled sheet of FIG. 3A taken through line 4-4.

An exemplary paneled sheet 37 that has been molded using the molding apparatus of FIG. 2 is illustrated in FIGS. 3A, 3B, and 4. In a preferred aspect, the overall configuration of the paneled sheet 37 is such that it is generally flat. That is, as shown in FIG. 4, the vertices of each of the polygons (e.g., the hexagon and pentagon panels) generally lie in the same plane. However, each of the panels within the panel pattern 40 of the paneled sheet 37 is curved in three dimensions to track that of the radius of curvature of the final ball 10. The panels within the panel pattern are delineated by a plurality of interior panel boundaries 43.

It will be appreciated that the first mold 116 has a plurality of patterned panel recesses 117a for forming the top surface of the panels in the panel pattern 40 in the paneled sheet and a plurality of protrusions 117b for forming the interior panel boundaries 43. Likewise, the second mold 118 has a plurality of panel protrusions 119a for forming the bottom surface of the panels in the panel pattern 40 and recesses 119b for forming the interior panel boundaries 43. The configuration and pattern of the recesses and protrusions will depend upon the paneled pattern that is desired in the final game ball. For example, in a preferred aspect, the patterned panel recesses 117a and protrusions 117b of the first mold 116 will be capable of forming the top of the paneled sheet 37 shown in FIG. 3A. Likewise, the panel protrusions 119a and recesses 119b of the second mold 118 will be capable of forming the bottom of the paneled sheet 37 shown in FIG. 33.

The paneled sheet 37 may also be molded such that it includes various topographical or surface features, e.g. ribs, channels, poles, graphics, logos, and the like. Further, the surface features may include a pebbled or dimpled texture on the surface (similar to that found in a conventional basketball). While such topographical or surface features may be formed during the molding process, it will be appreciated that such features may be applied after molding, for example by etching with a laser or embossing with a suitable mechanical device.

In the exemplary paneled sheet 37, the panel pattern 40 in the paneled sheet 37 comprises a plurality of polygon panels 42 delineated by various depressions, channels, or grooves, protrusions, or ridges (depending on whether viewed from a top (e.g., FIG. 3A) or bottom (e.g., FIG. 3B)), which are collectively referred to as an "interior panel boundary" 43. The interior panel boundaries preferably have dimensions that mimic a conventional hand-stitched seam on a soccer ball. Typically, the boundaries 43 are about 2 mm to 6 mm in width (e.g., about 2.0, 2.2, 2.4, 2.6, 2.8, 3.0, 3.2, 3.4, 3.6, 3.8, 4.0, 4.2, 4.4, 4.6, 4.8, 5.0, 5.2, 5.4, 5.6, 5.8, or 6.0 mm in width, and preferably about 3.2 to 4.0 mm, and still more preferably 3.6 mm in width), and have a depth of about 1.0 to 2.0 mm (e.g., about 1.0, 1.2, 1.4, 1.6, 1.8, or 2.0 mm deep, and preferably about 1.8 mm deep).

An exemplary panel pattern 40 is shown in FIGS. 3A and 3B. This panel pattern 40 corresponds to that of one hemispherical portion of a soccer ball. The panel pattern 40 comprises six pentagon panels 44a, 44b, 44c, 44d, 44e, 44f and ten hexagon panels 46a, 46b, 46c, 46d, 46e, 46f, 46g, 46h, 46i, 46j. Each side of the center pentagon panel 44a is adjacent to a first side of five inner hexagon panels 46a, 46b, 46c, 46d, 46e. A second side of each the five inner hexagon panels 46a, 46b, 46c, 46d, 46e is adjacent to a first side of five adjacent outer hexagon panels 46f, 46g, 46h, 46i, 46j. A third side of each of the five inner hexagon panels 46a, 46b, 46c, 46d, 46e is also adjacent to a first side of the five outer pentagon panels 44b, 44c, 44d, 44e, 44f.

It will be appreciated to those skilled in the art that the panel pattern 40 in the paneled sheet 37 may be of various forms. For example, while exemplary panel pattern 40 is depicted as having the shapes of equilateral pentagons and hexagons, the panels may have non-equilateral shapes. The panel pattern may include a variety of other shapes (e.g. triangular, square, rectangular, pentagonal, hexagonal, trapezoidal, round, oval) that combine in a tessellation-type manner to form the cover, and the panel pattern may also include non-regular or non-geometrical shapes.

After forming the paneled sheet 37, the paneled sheet 37 is cut to form the cover panel blank 35. The cover panel blank includes the panel pattern 40. Excess cover material 32 is removed in order to provide free edges around the periphery of the cover panel blank, while the panel pattern 40 is retained by a combination of the free edges and the interior panel boundaries. The excess cover material 32 is preferably removed by die-cutting.

Figure 5:
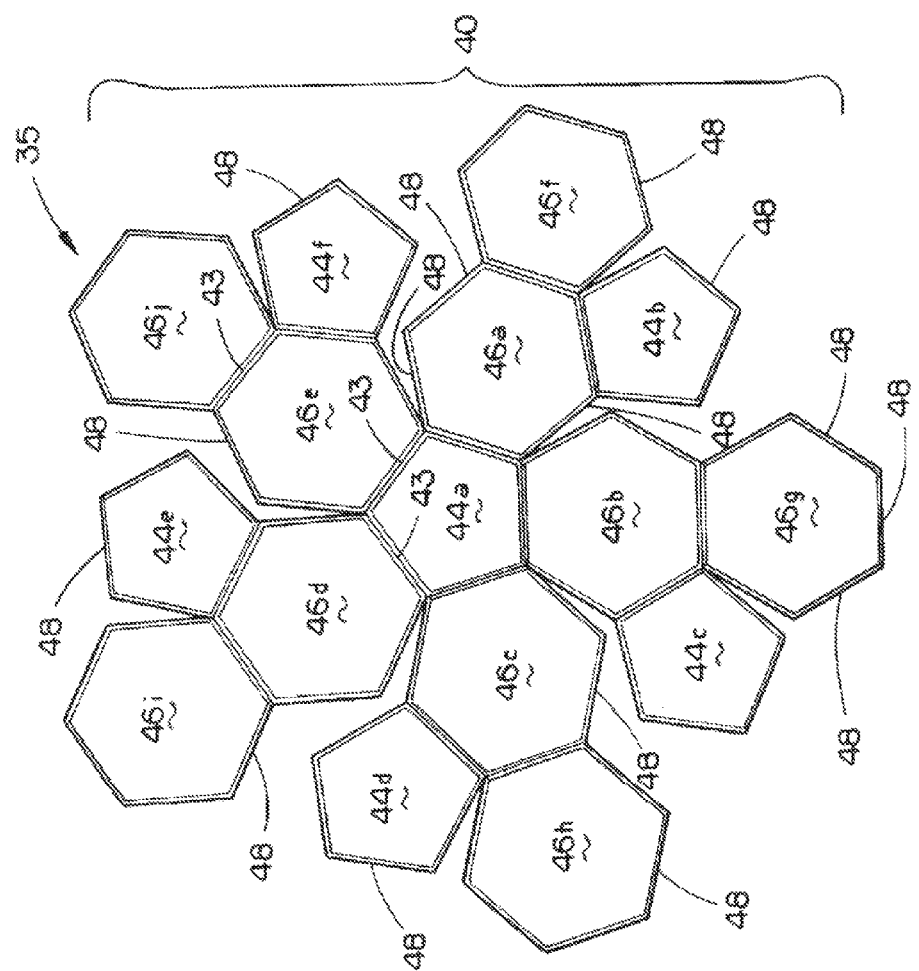
FIG. 5 is a top plan view of a cover panel blank that has been die cut from the paneled sheet shown in FIG. 3A, FIG. 3B, and FIG. 4.

FIG. 5 illustrates an exemplary cover panel blank 35 formed from the paneled sheet 37 of FIGS. 3A, 3B, and 4. Center pentagon panel 44a is delineated from the five inner hexagon panels 46a, 46b, 46c, 46d, 46e by interior panel boundaries 43. Center pentagon panel 44a contains no free edges 48. The five inner hexagon panels 46a, 46b, 46c, 46d, 46e are delineated from the center pentagon panel 44a, the five outer hexagon panels 46f, 46g, 46h, 46i, 46j, and the five outer pentagon panels 44b, 44c, 44d, 44e, 441 by interior panel boundaries 43. Each inner hexagon panel 46a, 46b, 46c, 46d, 46e contains three free edges 48. Each outer hexagon panel 46f, 46g, 46h, 46i, 46j has Five free edges 48, and each outer pentagon panel 44b, 44c, 44d, 44e, 44f has four free edges 48. The polygon panels are integrally connected insofar as they are formed from a single sheet of cover material, but are delineated by interior panel boundaries as discussed above.

As discussed more fully below, in this exemplary embodiment, the free edges 48 of the cover panel blank are heat bonded together to form a hemispherical cover portion 50, and are also heat bonded to a reinforcement material blank 65 along the free edges 48 and the interior panel boundaries 43.

The reinforcement material blank 65 is comprised of a reinforcement material 60. The reinforcement material 60 preferably comprises one or more of synthetic leather, thermoplastic urethane, polyurethane, polyvinyl chloride, thermoplastic elastomer, rubber, various other thermoplastic or thermoset materials, or other suitable materials, whether synthetic or natural, that are generally durable and wear-resistant. In some configurations, the cover material may have a layered configuration that combines two or more materials, which are typically co-extruded. For example, an exterior portion of the cover material may be formed from polyurethane or polyvinyl chloride, and an interior portion of the cover material may be formed from a textile element (e.g., woven or non-woven fabric). That is, a textile element which serves as a backing or support may be bonded to the polyurethane or polyvinyl chloride and positioned proximate to the bladder. The reinforcement material 60 may be the same or different as the cover material 32. The thickness of the reinforcing material is about 0.5 mm to 4 mm (e.g., about 0.5, 1.0, 1.5, 2.0, 2.5, 3.0, 3.5, or 4.0 mm).

The selection of the cover material and reinforcement material, as well as the thickness of each, is preferably selected so that the combined weight of each, as well as the bladder, comply with the applicable sporting regulations, for example, the International Federation of Association Football in the case of soccer balls.

The reinforcement material blank 65 is configured and shaped such that it may be aligned with the free edges 48, and preferably also the interior panel boundaries 43, of the cover panel blank 35 to form the reinforced ball cover or cover portion. The reinforcement material blank 65 is typically prepared by die-cutting a suitable material into the desired configuration.

Figure 6:
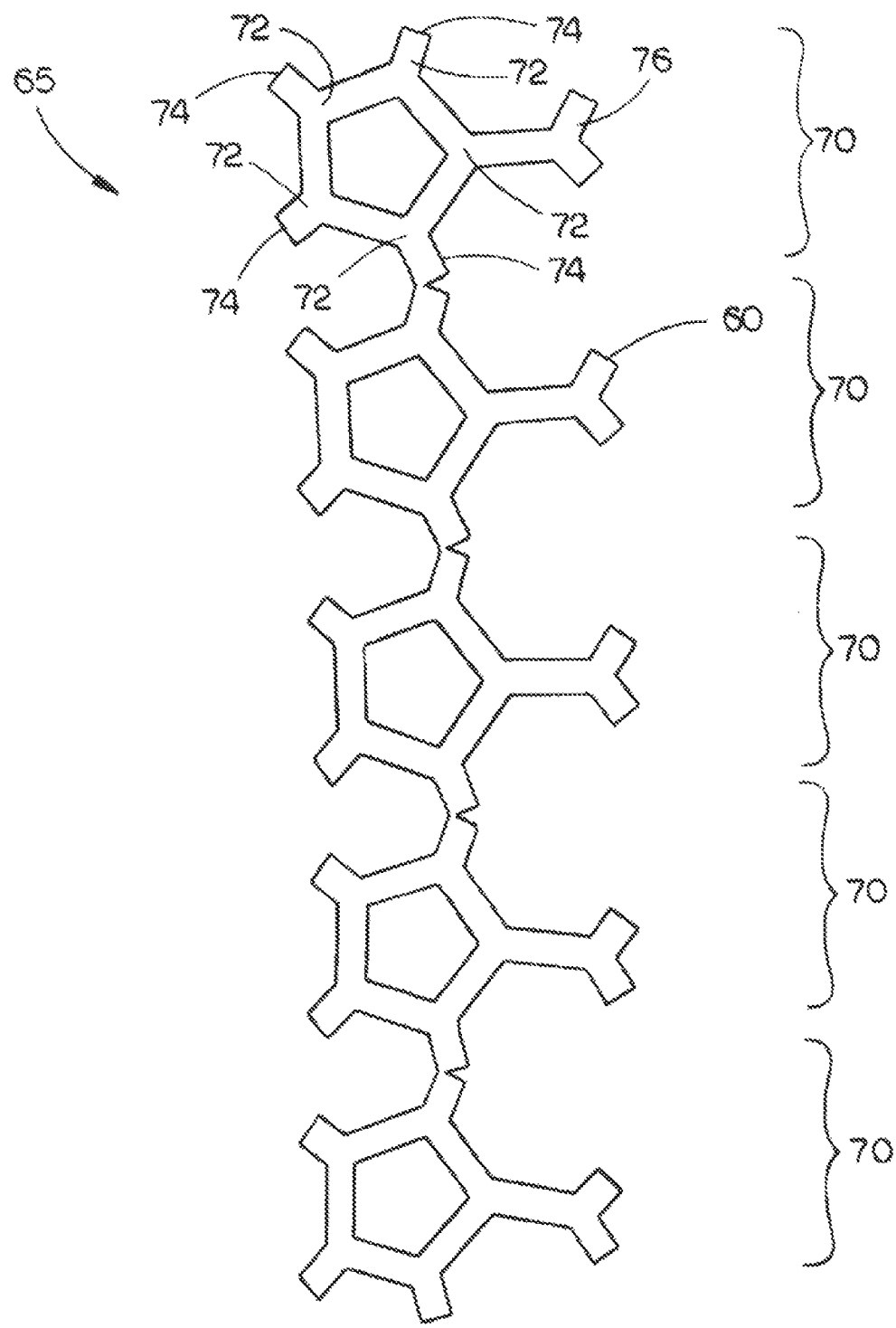
FIG. 6 is a top plan view of an exemplary reinforcement material blank.

An exemplary reinforcement material blank 65 is illustrated in FIG. 6. The reinforcement material blank 65 comprises a plurality of linked polygon outlines 70, wherein each vertice 72 of the polygon outline contains a radiating arm 74 extending therefrom. One of the radiating arms 74 from each polygon outline has a Y-shaped terminus 76, while the four other radiating arms 74 from each polygon outline are generally linear and equidistant in length. Typically, width of the reinforcement material blank is about 6 to 25 mm (e.g., about 6, 7, 8, 9, 10, 11, 12, 13, 14, 15, 16, 17, 18, 19, 20, 21, 22, 23, 24, or 25 mm, and preferably about 10 to 18 mm, and most preferably about 14 mm wide). The width is designed to track that of a conventional hand-stitched seam. In some embodiments, the width of the reinforcement material blank is slightly wider than a conventional hand-stitched seam in order to improve the overall performance of the ball.

It will be readily appreciated that the configuration of the reinforcement material blank 65 may comprise a plurality of reinforcement material blank portions instead of a single reinforcement material blank as illustrated in FIG. 6. For example, each of the five pentagon outlines illustrated in FIG. 6 could be separate reinforcement material blank portions. Further, sections of each pentagon could be separately fabricated e.g., the reinforcement material blank portion could be two sides of the pentagon). A reinforcement material blank 65 comprised of a single piece of reinforcement material (as opposed to sections) is preferable because it decreases the time associated with the manufacture of the sports ball.

Further, it will be appreciated that the configuration of the reinforcement material blank 65 will vary depending upon the panel pattern 40 in the cover panel blank 35. Thus, the reinforcement material blank may include triangular, square, rectangular, pentagonal, hexagonal, trapezoidal, round, or even oval outlines depending on the nature of the panel pattern 40 in the cover panel blank.

Figure 7A:
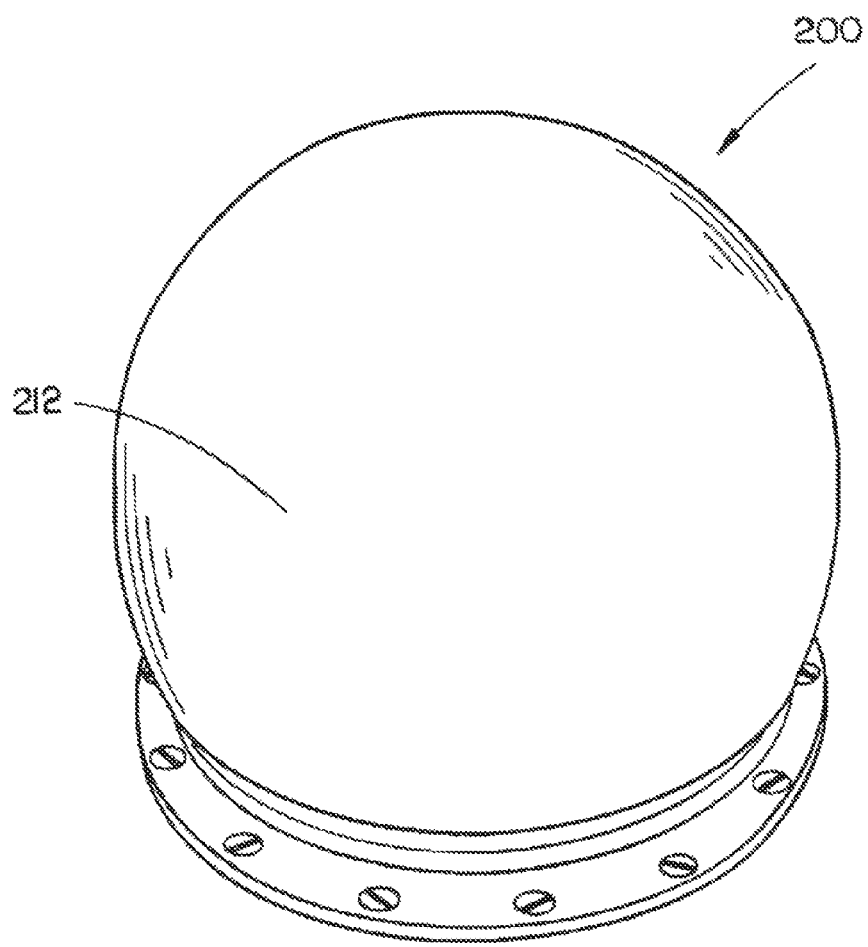
FIG. 7A is a perspective view of an exemplary flow molding apparatus for forming a hemispherical cover portion of the soccer ball in accordance with the present invention.

After forming the cover panel blank 35 and the reinforcement material blank 65, the two are then heat bonded together to form the cover or cover portion of the game ball. In a preferred embodiment, the materials are heat bonded together using a flow molding apparatus, for example using dielectric heating. An exemplary flow molding apparatus 200 is illustrated in FIGS. 7-8. In general, the flow molding apparatus includes a top electrode 212 and a bottom electrode 214, both of which are connected to an electromagnetic energy source (not shown) operable to generate an alternating radio frequency electric field between the electrodes. The electrodes 212, 214 are preferably spherical in shape so that the ball hemisphere will be evenly heated, as generally discussed in Marc. U.S. Pat. No. 4,268,238, which is incorporated by reference.

Figure 7B:
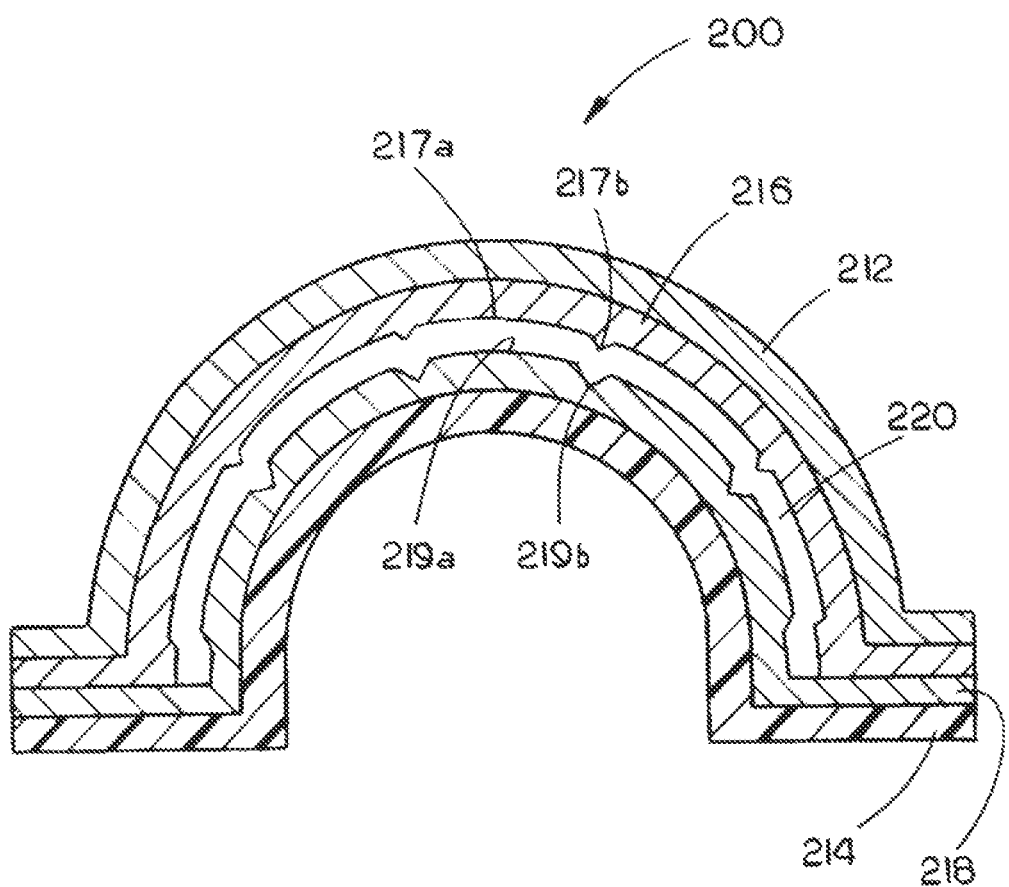
FIG. 7B is a diagram illustrating a cross-section of the exemplary flow molding apparatus of FIG. 7A for forming a hemispherical cover portion of the soccer ball.

Also included within the apparatus are a first mold and a second mold. As shown in FIG. 7B, the first mold comprises a female ball cover mold 216 and the second mold encompasses a male ball cover mold 218 that together define a molding cavity 220 therebetween. The female ball cover mold 216 is hemispherical in shape, and contains a plurality of patterned panel recesses 217a for receiving the corresponding panels in the panel pattern 40 in the cover panel blank 35 and protrusions 217b to be aligned with the interior panel boundaries 43 and free edges 48. Likewise, the male ball cover mold 218 contains a plurality of panel protrusions 219a to be aligned with the corresponding panels in the panel pattern 40 of the cover panel blank 35 and recesses 219b for receiving the reinforcement material blank 65 that is aligned with the interior panel boundaries 43 and free edges 48 of the cover panel blank 35. The female ball cover mold 216 and the male ball cover mold 218 are aligned such that the reinforcement material blank 65 is aligned with the free edges 48, and preferably also the interior panel boundaries 43, of the cover panel blank 35.

Figure 8A:
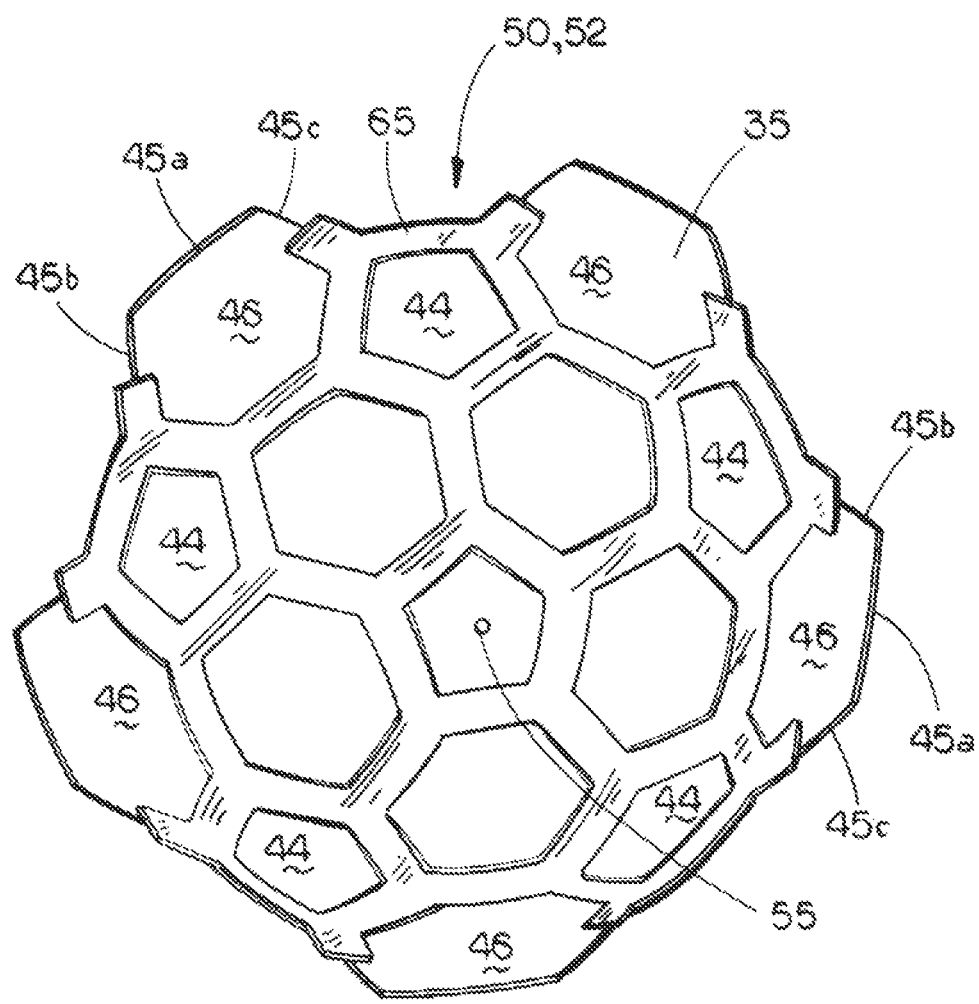
FIG. 8A is a perspective view of a hemispherical cover portion of the ball cover, when viewed from what will be the interior of the ball.

For heat bonding, the alternating electric field may be generated at frequencies ranging from 1 MHz to 500 MHz, preferably generated at frequencies ranging from 10 MHz to 200 MHz, and is most preferably generated at either 27.12 MHz or 40.68 MHz. The energy is typically applied for about 10 to 80 seconds (e.g. about 10, 20, 30, 40, 50, 60, 70, or 80 seconds). The reinforcement material blank 65 is thus heat bonded to the cover panel blank 35 such that reinforcing material is located along all or part of the free edges (which are heat bonded and thus no longer "free" after heat bonding) of the cover panel blank 35, and preferably along the interior panel boundaries 48. A first hemispherical cover portion 50 of the ball cover is thus formed, which is generally shown in FIG. 8A and FIG. 813. A second hemispherical cover portion 52 of the ball cover may be made in similar fashion (thus FIGS. 8A and 813 are labeled as hemispherical cover portions 50, 52).

To assemble the sports ball, the first and second hemispherical cover portions 50, 52 of the reinforced ball cover 30 are heat bonded together. In a preferred aspect, first and second hemispherical cover portions 50, 52 of the ball cover are heat bonded together only at the overlapping areas of each of the hemispherical cover portions. One of the two hemispherical cover portions 50, 52 also has a die cut hole 55 in one of the panels, for example in the center pentagon panel 44a, for the location of the bladder valve 25.

Figure 9A:
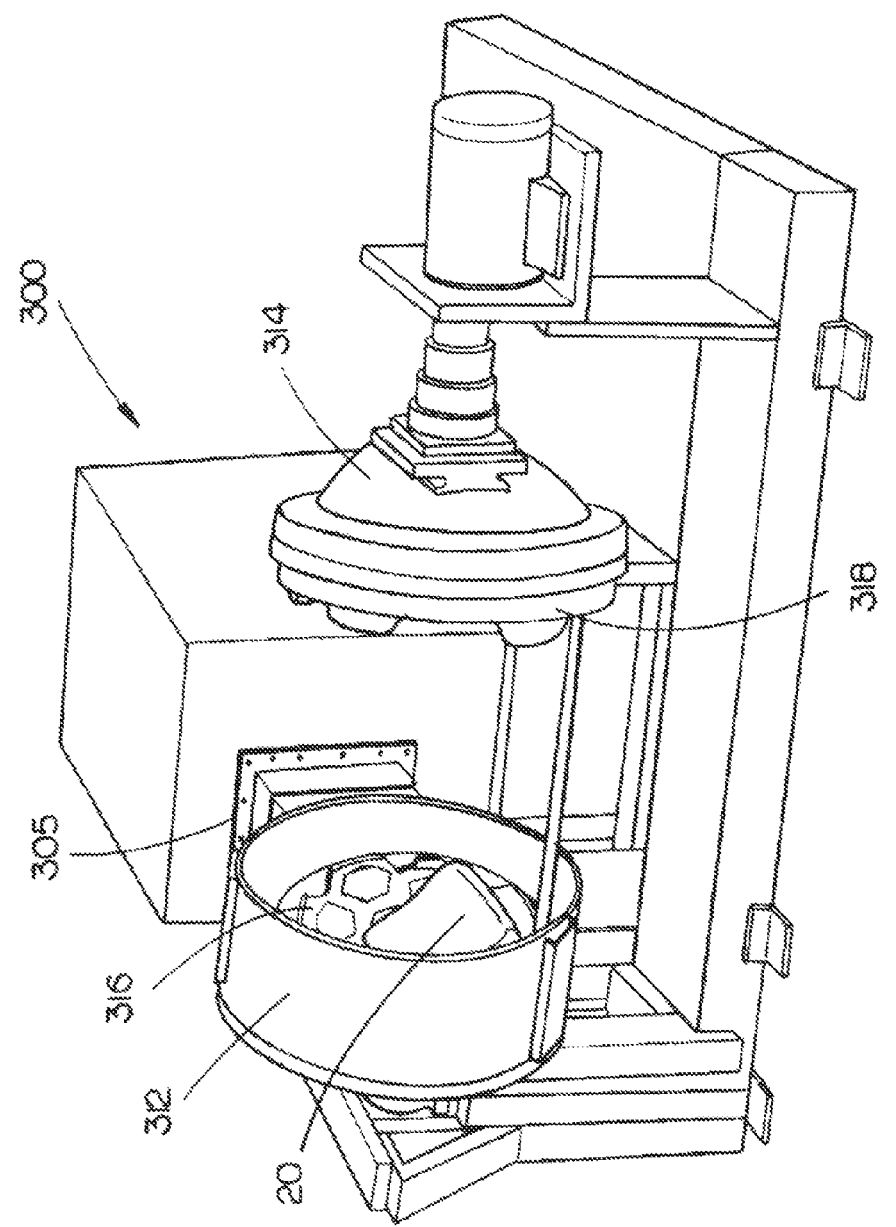

FIGS. 9A-D illustrate a first exemplary molding apparatus 300 for heat bonding the hemispherical cover portions 50, 52 of the ball cover together. The molding apparatus contains a first shield 312 and a second shield 314, both of which shield electromagnetic energy from a source operable to generate microwave heat and function to trap the microwave energy inside the apparatus. Typically, the energy is applied for about 1 to 3 minutes. The microwave energy is preferably generated though a waveguide 305 centered between the overlapping sections of the two hemispherical cover portions 50, 52 and having a width about the size of the overlapping sections. The overlapping sections are preferably located at the peak of the sinusoidal wave of the microwave energy so that most of the microwave energy is localized on the overlapping sections of the two hemispherical cover portions. Also included within the apparatus are a first mold 316 and a second mold 318 that together define a molding cavity therebetween. The first and second molds 316, 318 each receive one of the hemispherical cover portions 50, 52 of the reinforced ball cover 30. Thus, the molds preferably contain panel recesses for receiving the panels in the cover and protrusions for receiving the interior panel boundaries. FIGS. 9A, 913, and 9C illustrate a bladder 20 having an air valve 25 connected to tubing 27. The tubing 27 is inserted into the hole 55 in one of the hemispherical cover portions and also through a hole 310 in the first mold 316 and shield 312 (FIG. 9C). The tubing 27 is connected to a pressure regulator (not shown) that is capable of inflating or deflating the bladder 20 as desired. The molds are closed, and then the bladder 20 is preferably inflated, typically between 0.6 bar to 0.8 bar through a needle located at the end of the tubing 27. The first and second hemispherical cover portions 50, 52 of the reinforced ball cover 30 are heat bonded together using microwave energy while rotating the ball cover, preferably at least 360 degrees, in order to apply even heating along the entire circumference of the ball cover in the overlapping areas of the two hemispherical portions 50, 52. The ball cover may be rotated using a rotating means 317, such as chains, gears, and the like, or even manually. After heating the hemispherical cover portions 50, 52 together and inflating the bladder 20 as desired, the sports ball 10 is formed. The reinforced cover 30 thus comprises a cover material having a plurality of panels in which reinforcement material is heat bonded along the interior panel boundaries of the cover material, as well as the former "free" edges (that are no longer free after heat bonding). The air valve 25 inserted into the hole 55 in one of the hemispherical cover portions of the ball cover allows for inflation or deflation of the bladder 20 as desired.

Figure 10A:
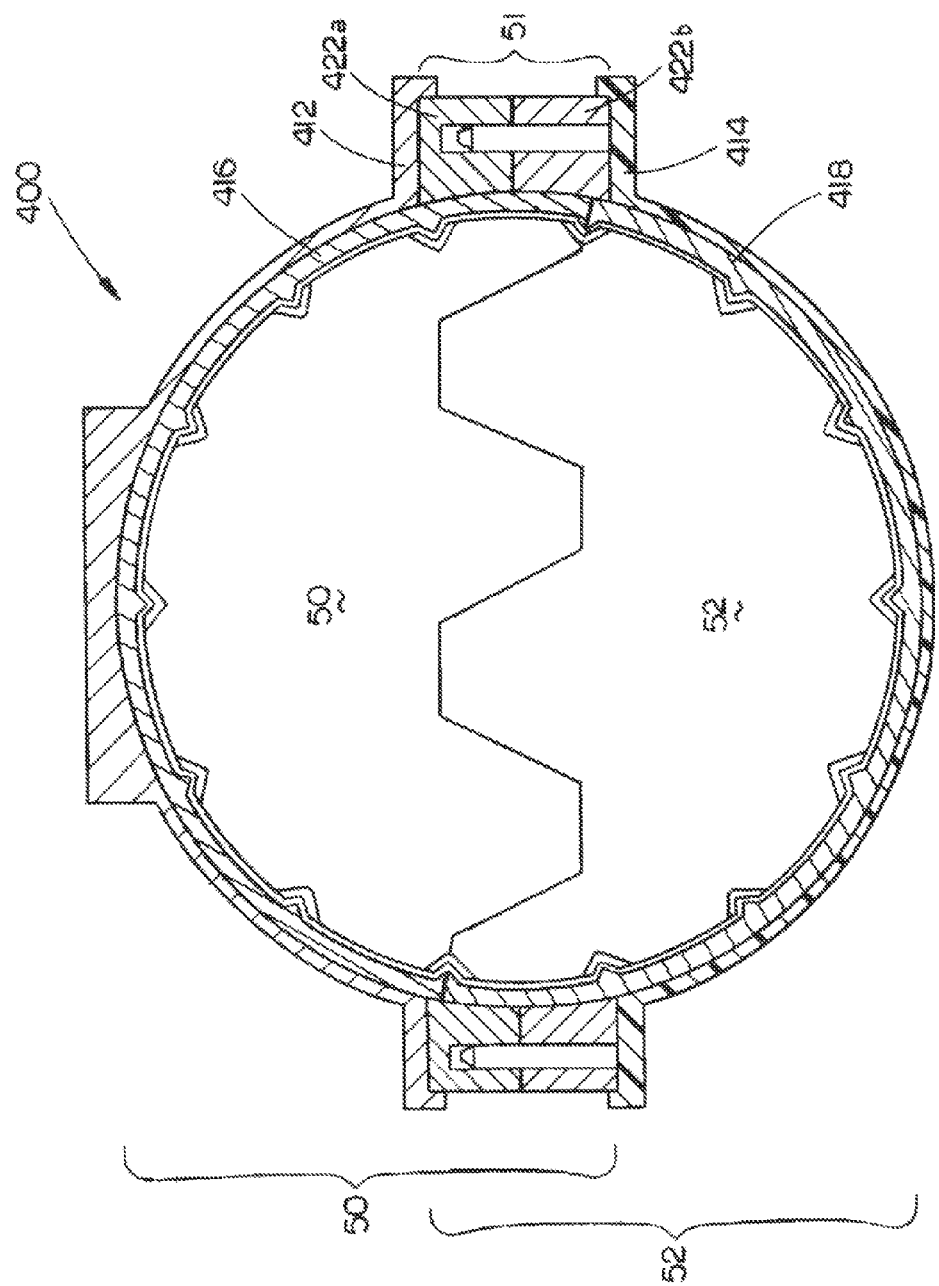
FIGS. 10A and 10B illustrate a molding apparatus for joining the two ball cover hemispherical cover portions (each one-half of the ball) together.
Figure 10B:
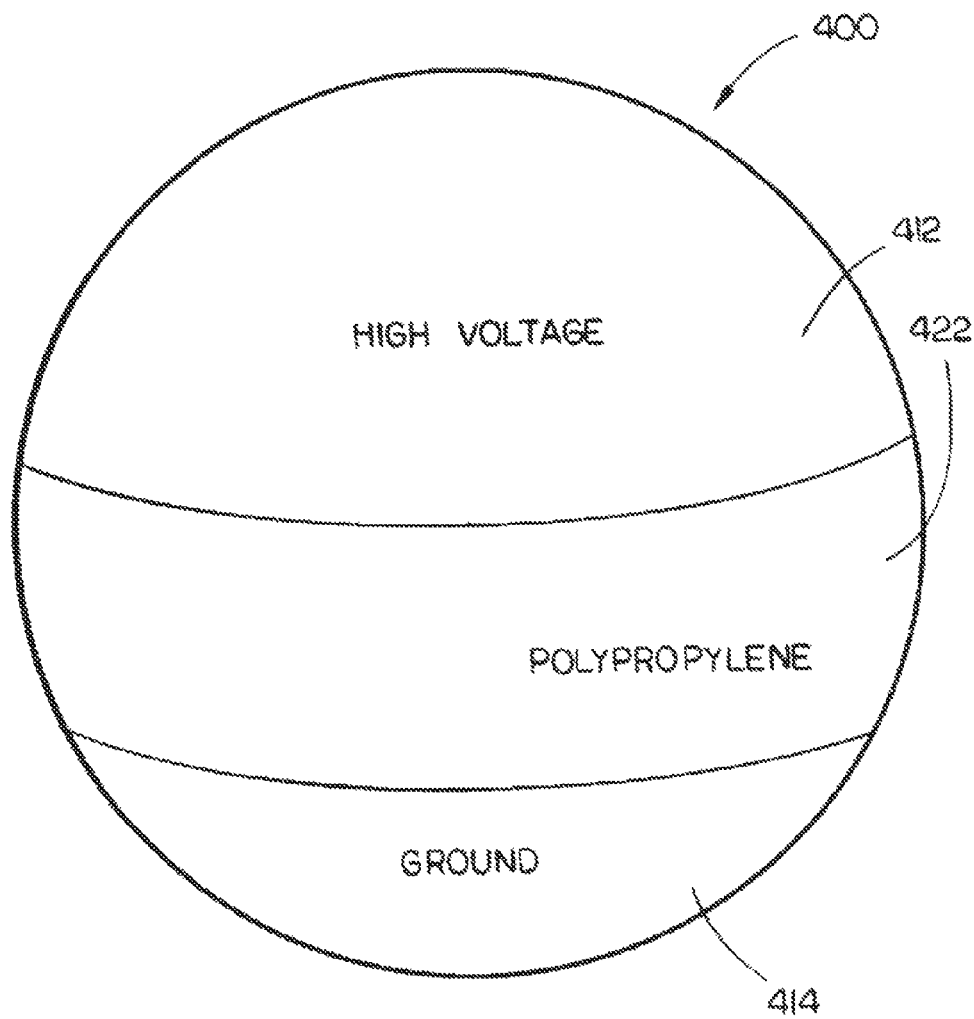

FIGS. 10A and 10B illustrates a second exemplary molding apparatus 400 for heat bonding each of the hemispherical cover portions 50, 52 of the ball cover together. The molding apparatus contains a first electrode 412 and a second electrode 414, both of which are connected to an electromagnetic energy source (not shown) operable to generate an alternating electric field between the electrodes. The electrodes 412, 414 are preferably hemispherical in shape, but may also constitute rings which generally reside above and below the overlapping sections 51 of the two hemispherical cover portions 50, 52 of the ball. The alternating electric field may be generated at frequencies ranging from 1 MHz to 500 MHz, preferably generated at frequencies ranging from 10 MHz to 200 MHz, and is most preferably generated at either 27.12 MHz or 40.68 MHz. Typically the energy is applied for about 10 to 40 seconds (e.g., about 10, 15, 25, 30, 35, or 40 seconds). Also included within the apparatus are a first outer mold 416 and a second outer mold 418 that together define a ball molding cavity therebetween. As shown in FIG. 10A, the first and second molds 416, 418 each receive a hemispherical cover portion 50, 52 of the reinforced ball cover 30. Thus, the molds 416, 418 preferably contain panel recesses for receiving the panels in the cover and protrusions for receiving the interior panel boundaries.

The molding apparatus 400 also includes a ring 422 comprised of a dielectric material, such as polyethylene or polypropylene, which separates the electrodes 412, 414. In FIG. 10A, two rings of dielectric material are illustrated—one ring 422a, which is adjacent to the first electrode 412, and another ring 422b which is adjacent to the second electrode 414 when the molding apparatus is in the closed position. It will also be appreciated that the ring(s) 422 may comprise part of the first and second molds 416, 418, which are also comprised of a dielectric material. The ring 422 of dielectric material has a width about the size of the overlapping sections 51 of each of the two hemispherical cover portions 50, 52 which are heat bonded together to form the final ball 10. A pin, screw, lock, tongue/groove, or other joining means may be used to secure the molds together.

To construct the game ball in accordance with this embodiment, the first mold 416 and second mold 418 of the flow molding apparatus are separated. The first and second hemispherical cover portions 50, 52 of the reinforced ball cover 30 are placed within the molding cavity of the molds (along with the bladder 20, not shown in FIG. 10A for clarity). The molds are closed, and the bladder is inflated, typically between 0.6 and 0.8 bar (through a hole in the mold and one of the hemispherical cover portions, as generally described above). The bladder functions as an inner mold to help keep the two hemispherical portions aligned. The first and second hemispherical cover portions 50, 52 of the reinforced ball cover 30 are heat bonded together, preferably using dielectric heating. Alternating radio frequency electric field energy is generated between the electrodes. It will be appreciated that the dielectric constant of the hemispherical cover portions 50, 52 is greater than that of the air inside the bladder 20, and is also greater than the molds 416, 418 and dielectric ring(s) 422a, 422b. For example, in a typical embodiment, the dielectric constant of the air inside the bladder is about 1, the dielectric constant of the dielectric ring is about 2, the dielectric constant of the outer molds 416, 418 is about 3, and the dielectric constant of the hemispherical cover portions is about 6. As a result, the current preferentially travels through the hemispherical cover portions 50, 52 in the overlapping sections 51 located between the first and second electrodes 412, 414. As a result, the energy associated with the alternating electric field is preferentially directed between the overlapping sections of the two hemispherical cover portions 50, 52 thereby heat bonding the two hemispherical cover portions 50, 52 together. After heating the hemispherical cover portions 50, 52 together, the final sports ball 10 is formed. The reinforced cover thus comprises a cover material comprised of a plurality of panels in which reinforcement material is heat bonded along the interior panel boundaries of the cover material, as well as the former "free" edges (that are no longer free after heat bonding). The air valve 25 inserted into the hole 55 in one of the hemispherical cover portions of the ball cover allows for inflation or deflation of the bladder 20 as desired.

Figure 8B:
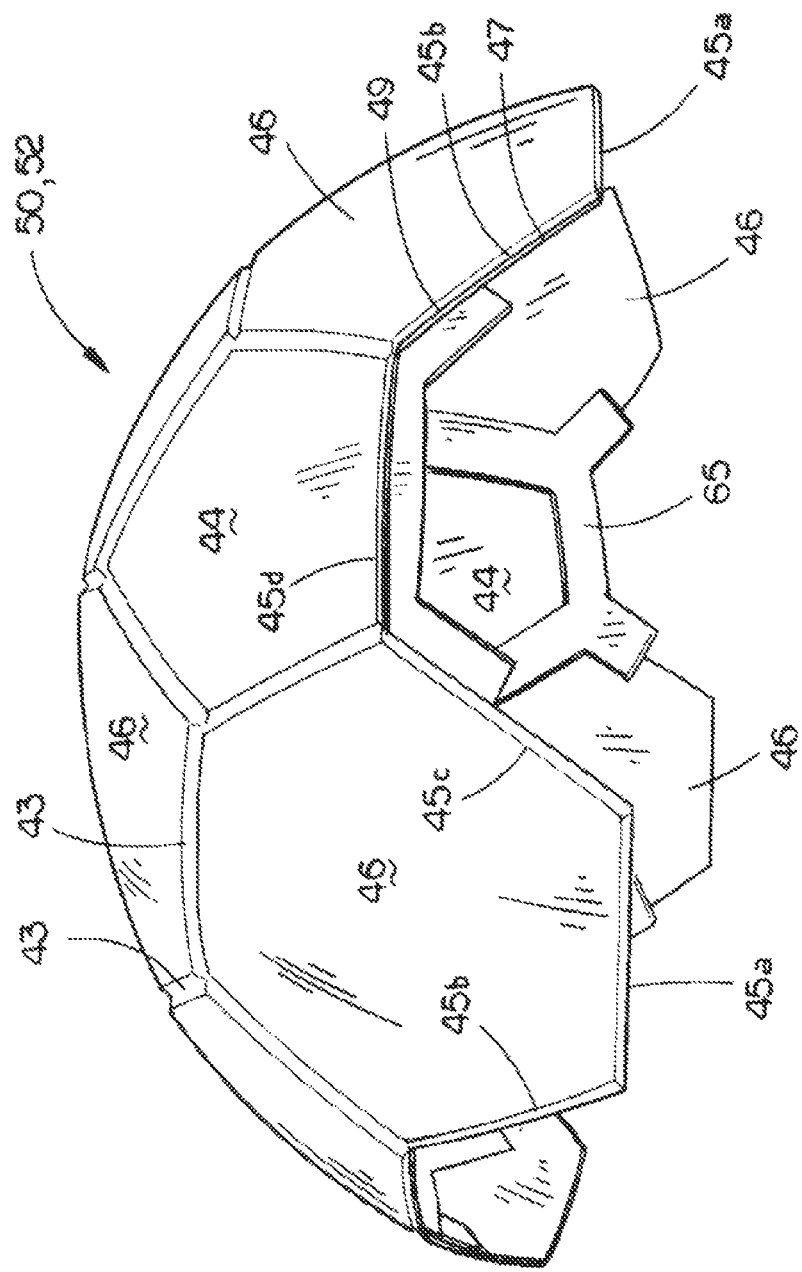
FIG. 8B is a perspective view of a hemispherical cover portion of the ball cover, when viewed from what will be the exterior of the ball. The reinforcement material has been bonded to the cover material.
Figure 10C:
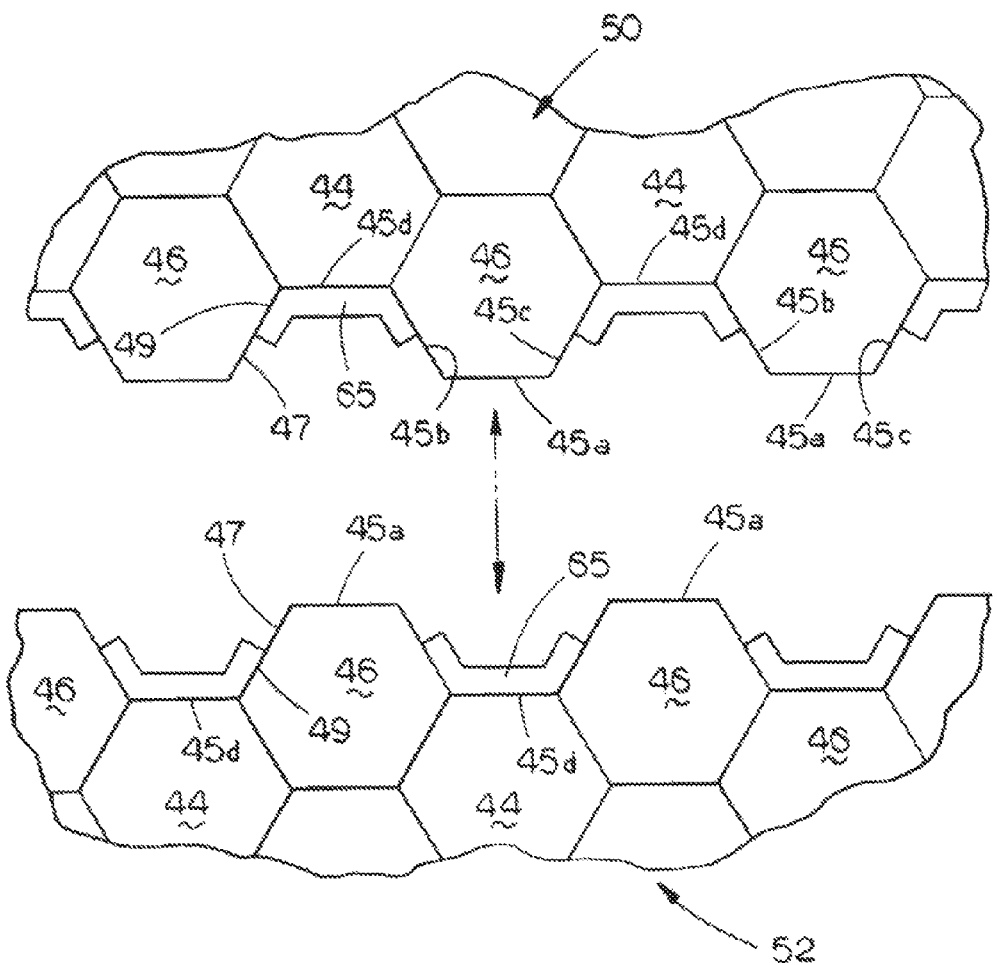

FIG. 10C illustrates the alignment of the two hemispherical cover portions 50, 52 of the ball cover generally shown in FIGS. 8A and 8B during the heat bonding process. In the exemplary embodiment, the edge of each hemispherical cover portion 50, 52 comprises a first polygon panel (hexagon panel 46) alternating with a second polygon panel (pentagon panel 44). The hexagon panels 46 each have three terminal hexagon panel edges: a first terminal hexagon panel edge 45a which is completely free of reinforcement material and second and third terminal hexagon panel edges 45b, 45c which have a portion thereof covered overlapping reinforcement material from the reinforcement material blank 65. That is, as best shown in FIG. 8B and FIG. 10C, second and third terminal hexagon panel edges 45b, 45c each have a first terminal hexagon panel edge portion 47 which is free of reinforcement material and second terminal hexagon panel edge portion 49 which has overlapping reinforcement material. The pentagon panels 44 each have a terminal pentagon panel edge 45d covered with overlapping reinforcement material (FIG. 8B and FIG. 10C).

FIG. 10C illustrates how the two hemispherical cover portions 50, 52 are aligned within the molding cavity. Each of the first terminal hexagon panel edges 45a (free of reinforcement material) from the first hemispherical cover portion 50 is aligned with each of the terminal pentagon panel edges 45d having overlapping reinforcement material from the second hemispherical cover portion 52. Further, each of the second and third terminal hexagon panel edges 45b, 45c having a portion thereof covered with overlapping reinforcement material from the first hemispherical cover portion 50 is aligned with the second and third terminal hexagon panel edges 45b, 45c having a portion thereof covered with overlapping reinforcement material from the second hemispherical cover portion 52. That is, the first terminal hexagon panel edge portion 47 which is free of reinforcement material from the first hemispherical cover portion 50 is aligned with a corresponding second terminal hexagon panel edge portion 49 which has overlapping reinforcement material from the second hemispherical cover portion 52. As a result, reinforcement material overlies and overlaps all of the terminal edges 45a, 45b, 45c when the two hemispherical cover portions 50, 52 are so aligned. Heat bonding is then applied to the hemispherical cover portions 50, 52, preferably limited to the area of overlap 51, so that the two hemispherical cover portions form the final ball 10. It will be appreciated that this alignment may be used for either of the exemplary molding apparatuses illustrated in FIG. 9 or FIG. 10.

In another exemplary embodiment, the cover panel blank 35 is heat bonded to the reinforcement material blank 65 in a flow molding apparatus 500 adapted to form the reinforced cover 30 in a single step. That is, rather to form two hemispherical cover portions 50, 52 (or a plurality of other portions) in a first step that are then heat-bonded together in a second step, the entire spherical reinforced cover 30 is formed in a single step.

Figure 11:
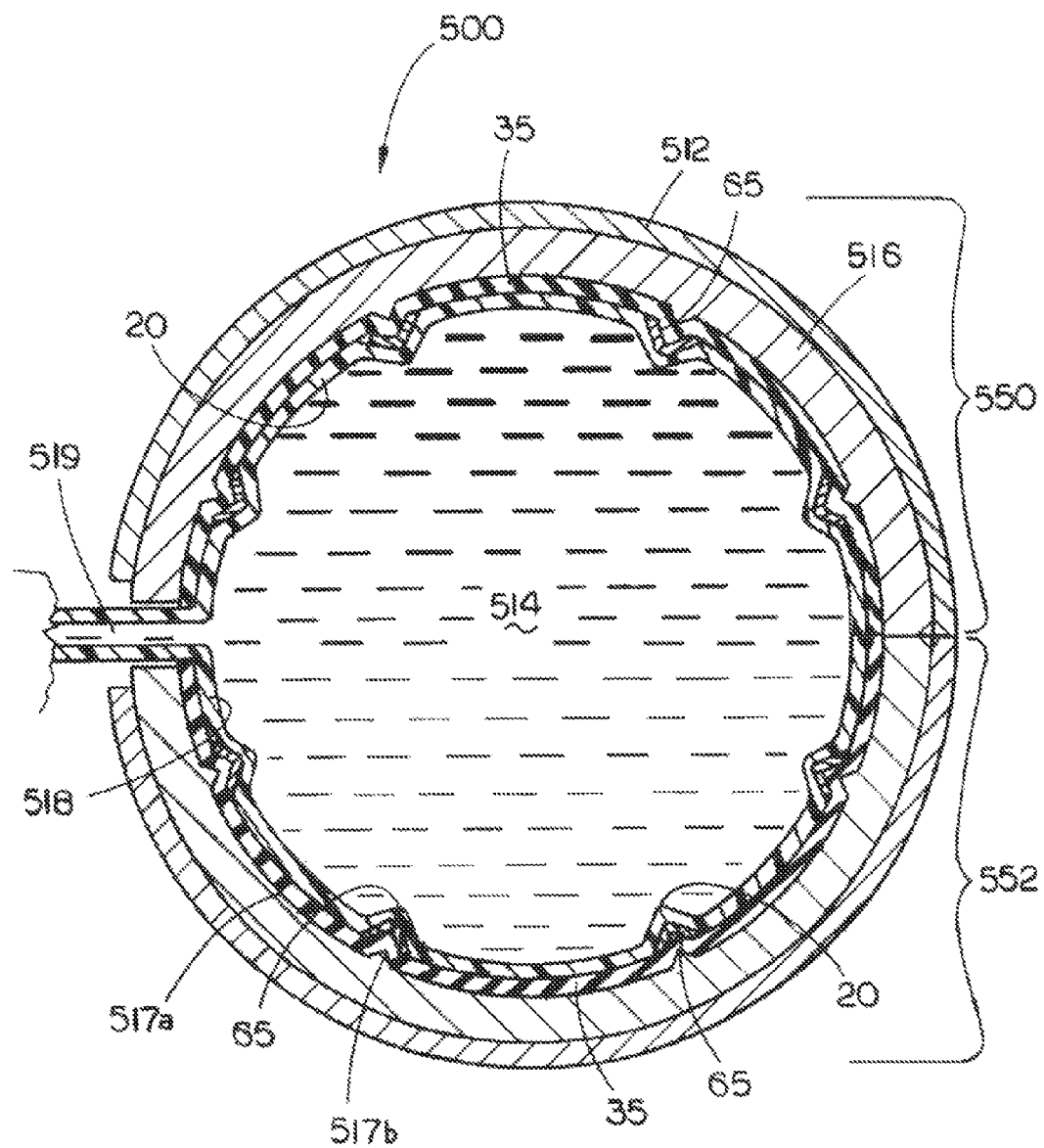
FIG. 11 illustrates a molding apparatus for molding an entire soccer ball cover comprising the cover panel blank and reinforcement material blank in a single step.

An exemplary flow molding apparatus 500 is illustrated in FIG. 11. In general, the flow molding apparatus includes an outer electrode 512 and an inner conductive fluid housed in a bladder 20. The inner conductive fluid functions as an inner electrode 514. Both the outer electrode 512 and inner electrode 514 are connected to an electromagnetic energy source (not shown) operable to generate an alternating electric field between the electrodes. Also included within the apparatus is an outer mold 516. The bladder 20 functions as an inner mold 518. A molding cavity is defined between the outer mold 516 and inner mold (bladder) 518. The overall configuration (both the outer electrode 512 and the outer mold 516) is spherical in shape, although the outer electrode 512 and outer mold 516 may comprise a plurality of sections 550, 552 to permit placement and removal of the cover panel blank 35, reinforcement material blank 65, bladder 20, and the final ball 10 to and from the apparatus. The outer mold 516 contains a plurality of patterned panel recesses 517a for receiving the corresponding panels in the panel pattern 40 in the cover panel blank 35 and protrusions 517b to be aligned with the interior panel boundaries 43 and free edges 48 of the cover panel blank 35. Further, the outer electrode and outer mold 512 have at least one hole 519 in which the conductive fluid 514 may be injected or removed and/or the radio frequency generator may be attached to the electrodes.

To construct the soccer ball in accordance with this embodiment, a first section 550 of the flow molding apparatus and a second section 552 of the flow molding apparatus are separated. The polygon panels of the cover panel blank(s) 35 are then aligned within the corresponding panel recesses 517a of the outer mold 516. The protrusions 517b are aligned with the interior panel boundaries 43 and free edges 48 of the cover panel blank 35. The reinforcement material blank(s) 65 is then placed over the cover panel blank(s) 35 so that the interior panel boundaries 43 and free edges 48 of the cover panel blank(s) 35 are aligned with the reinforcement material blank(s) 65. Tape or other adhesive may be used to temporarily secure the reinforcement material blank(s) 65 to the cover panel blank(s) 35. The sections 550, 552 of the molding apparatus are then closed. Additional liquid conducting material may be injected through the hole 519 into the bladder 20 to ensure that the bladder tills the interior of the molding cavity and provides sufficient pressure. The liquid conducting material pushes the bladder 20 against the reinforcement material blank(s) 65 and cover panel blank(s) 35 and thus the bladder 20 functions as an inner mold 418.

An alternating electric field is then generated between the outer electrode 512 and the inner electrode 514. The alternating electric field may be generated at frequencies ranging from 1 MHz to 500 MHz, preferably generated at frequencies ranging, from 10 MHz to 200 MHz, and is most preferably generated at either 27.12 MHz or 40.68 MHz. The sections 550, 552 of the molding apparatus are then opened to remove the ball 10 having the reinforced cover 30. The reinforced cover thus comprises a cover material comprised of a plurality of panels in which reinforcement material is heat bonded along the interior panel boundaries of the cover material, as well as the former "free" edges (that are no longer free after heat bonding). The liquid conducting fluid may then be removed via the hole 519, and the bladder 20 may be inflated with air or other gas using an air valve 25 that has been inserted into the hole 519.

While the foregoing embodiment utilizes a bladder 20 tilled with a conductive fluid as an inner electrode 514, the inner electrode may be comprised of other materials. For example, the inner electrode 514 may comprise a bladder 20 that has been coated with a conductive material (such as silver). The bladder 20 may be filled with liquid or gas (such as air). The conductive material coating on the bladder 20 thus functions as the inner electrode 514 during the heat bonding process.

As discussed above, the present invention was described with respect to various exemplary embodiments. In one embodiment, the reinforced cover 30 comprises two hemispherical cover portions 50, 52 that comprise approximately 50% of the ball cover. Each hemispherical cover portion comprises a cover panel blank 35 and a reinforcement material blank 65 heat bonded together. Each of the hemispherical cover portions 50, 52 are then heat bonded together to form the completed ball 10. In the second embodiment, the cover comprises a cover panel blank(s) 35 and a reinforcement material blank(s) 65 that are heat bonded together to form the spherical reinforced cover 30 in a single step such that no intermediate hemispherical cover portions 50, 52 are formed.

In accordance with the foregoing, it will be appreciated that one or more cover panel blanks 35 and one or more reinforcement material blanks 65 may be utilized. For example, each of the cover panel blanks may comprise about 10%, 20%, 30%, 40%, 50%, 60%, 70%, 80%, 90% of the ball cover, or some combination thereof. As a more specific example, a hemispherical cover portion could be formed using four cover panel blanks comprising two hexagon panels and a pentagon panel and a fifth cover panel blank comprising two pentagon panels and two hexagon panels. That is, first cover panel blank would comprise inner pentagon panel 44a, inner hexagon panel 46a, outer hexagon panel 46f, and outer pentagon panel 44b. The second cover panel blank would comprise inner hexagon panel 46b, outer hexagon panel 46g, and outer pentagon panel 44c. The third cover panel blank would comprise inner hexagon panel 46c, outer hexagon panel 46h, and outer pentagon panel 44d. The fourth cover panel blank would comprise inner hexagon panel 46d, outer hexagon panel 46i, and outer pentagon panel 44e. The fifth cover panel blank would comprise inner hexagon panel 46e, outer hexagon panel 46j, and outer pentagon panel 44f. The various patterns and configurations of the cover panel blanks 35 are essentially unlimited. Likewise, the polygon outlines of the reinforcing material blank 65 need not be linked together, and sections of each polygon may be separately fabricated (e.g., two sides of the pentagon). The present invention contemplates various combinations of cover panel blanks 35 and reinforcement material blanks 65, provided that the reinforcement material is aligned with the interior panel boundaries.

It is anticipated that sports balls made in accordance with the present invention have structural elements that enhance the performance of the ball. The reinforcement material mimics the overall configuration of a conventional sports balls in which individual panels are hand-stitched together to make an interior seam. However, by molding the cover, the sports ball is a perfect sphere in contrast to balls which may have imperfections when hand-stitched. In addition, by eliminating the need for stitched seams in the cover, a waterproof ball may be prepared. Further, the structure of the cover continues to allow for deformation of the ball at the location of impact. As a result, in the case of a soccer ball, for example, the soccer ball will rotate in a manner similar to a conventional soccer ball in which the panels are hand-stitched together. In general, a ball having a cover in accordance with the present invention should actually rebound to its original shape faster than a conventional corresponding sports ball made using hand-stitched panels. This is advantageous because sports balls made in accordance with the present invention will exhibit less wobbling in the air.

From the foregoing it will be seen that this invention is one well adapted to attain all ends and objectives herein-above set forth, together with the other advantages which are obvious and which are inherent to the invention. Since many possible embodiments may be made of the invention without departing from the scope thereof, it is to be understood that all matters herein set forth or shown in the accompanying drawings are to be interpreted as illustrative, and not in a limiting sense. While specific embodiments have been shown and discussed, various modifications may of course be made, and the invention is not limited to the specific forms or arrangement of parts and steps described herein, except insofar as such limitations are included in the following claims. Further, it will be understood that certain features and subcombinations are of utility and may be employed without reference to other features and subcombinations. This is contemplated by and is within the scope of the claims.

What is claimed and desired to be secured by Letters Patent is as follows:

1. A sports ball comprising:
a first hemispherical cover portion comprising a first cover panel blank bonded to a first reinforcement material blank, wherein said first cover panel blank is formed from a first paneled sheet comprising a plurality of panels that are curved to have a radius of curvature of said sports ball, wherein said first paneled sheet is seamless such that each of said panels is integrally connected to adjacent panels of said sheet, and wherein said first reinforcement material blank comprises a plurality of linked polygon outlines;
a second hemispherical cover portion comprising a second cover panel blank bonded to a second reinforcement material blank, wherein said second cover panel blank is formed from a second paneled sheet comprising a plurality of panels that are curved to have said radius of curvature of said sports ball, wherein said second paneled sheet is seamless such that each of said panels is integrally connected to adjacent panels of said sheet, and wherein said second reinforcement material blank comprises a plurality of linked polygon outlines; and wherein said first hemispherical cover portion is bonded to said second hemispherical cover portion to form said sports ball.

2. The sports ball of claim 1 wherein each of said first and second cover panel blanks comprises six pentagon panels and ten hexagon panels.

3. The sports ball of claim 1 wherein each of said polygon outlines has a width about 6 mm to 25 mm.

4. The sports ball of claim 1 further comprising a bladder housed inside said first and second hemispherical cover portions and an air valve in said bladder.

5. The sports ball of claim 1 wherein each of said first and second cover panel blanks comprises a polyurethane polyvinyl chloride, synthetic leather, or a combination thereof supported by a woven or non-woven fabric.

6. The sports ball of claim 1 wherein said panels of each of said first and second cover panel blanks are defined by interior panel boundaries and free edges.

7. The sports ball of claim 6 wherein said first and second reinforcement material blanks are bonded to said first and second cover panel blanks, respectively, along said interior panel boundaries and said free edges.

8. The sports ball of claim 7 wherein said first and second reinforcement material blanks are heat bonded to said first and second cover panel blanks, respectively, along said interior panel boundaries and said free edges.

9. The sports ball of claim 8 wherein said first and second reinforcement material blanks are formed from a reinforcement material and said first and second cover panel blanks are formed from a cover material, and wherein said cover material and said reinforcement material flow together along said interior panel boundaries and said free edges.

10. The sports ball of claim 1 wherein each of said cover panel blanks comprises a center pentagon panel having five sides, wherein each side of said center pentagon panel is adjacent to a first side of five inner hexagon panels, and wherein a second side of each said five inner hexagon panels is adjacent to a first side of five outer hexagon panels, and wherein a third side of said five inner hexagon panels is adjacent to a first side of five outer pentagon panels.

11. The sports ball of claim 10 wherein each of said first and second reinforcement material blanks comprises five linked polygon outlines and a plurality of radiating arms extending from the vertices of the polygon outlines.

12. The sports ball of claim 11 wherein one radiating arm extending from each pentagon outline has a Y-shaped terminus.

13. The sports ball of claim 12 wherein four radiating arms extending from each pentagon outline are generally linear and equidistant in length.

14. The sports ball of claim 1 wherein said first and second paneled sheets are molded in a molding apparatus.

15. The sports ball of claim 14 wherein said first and second cover panels blanks are cut from said first and second paneled sheets, respectively.

16. The sports ball of claim 1 wherein said first hemispherical cover portion is bonded to said second hemispherical cover portion along overlapping sections between said cover portions.

17. The sports ball of claim 16 wherein said first hemispherical cover portion is heat bonded to said second hemispherical cover portion along said overlapping sections.

18. A sports ball comprising:
a first cover portion comprising a first cover panel blank bonded to a first reinforcement material blank, wherein said first cover panel blank is formed from a first continuous sheet of cover material comprising a plurality of panels, wherein said first continuous sheet of cover material is seamless such that each of said panels is integrally connected to adjacent panels of said sheet, and wherein said first reinforcement material blank comprises a plurality of linked polygon outlines;

a second cover portion comprising a second cover panel blank bonded to a second reinforcement material blank, wherein said second cover panel blank is formed from a second continuous sheet of cover material comprising a plurality of panels, wherein said second continuous sheet of cover material is seamless such that each of said panels is integrally connected to adjacent panels of said sheet, and wherein said second reinforcement material blank comprises a plurality of linked polygon outlines; and wherein said first cover portion is bonded to said second cover portion to form said sports ball.

19. The sports ball of claim 18 further comprising a bladder housed inside said first and second cover portions and an air valve in said bladder.

20. The sports ball of claim 18 wherein said panels of each of said first and second cover panel blanks are defined by interior panel boundaries and free edges.

21. The sports ball of claim 20 wherein said first and second reinforcement material blanks are bonded to said first and second cover panel blanks, respectively, along said interior panel boundaries and said free edges.

22. The sports ball of claim 18 wherein each of said first and second cover panel blanks comprises a center pentagon panel having five sides, wherein each side of said center pentagon panel is adjacent to a first side of five inner hexagon panels, and wherein a second side of each said five inner hexagon panels is adjacent to a first side of five outer hexagon panels, and wherein a third side of said five inner hexagon panels is adjacent to a first side of five outer pentagon panels.

23. The sports ball of claim 22 wherein each of said first and second reinforcement material blanks comprises five linked polygon outlines and a plurality of radiating arms extending from the vertices of the polygon outlines.

24. The sports ball of claim 23 wherein one radiating arm extending from each pentagon outline has a Y-shaped terminus.

25. The sports ball of claim 24 wherein four radiating arms extending from each pentagon outline are generally linear and equidistant in length.

26. The sports ball of claim 18 wherein said first and second continuous sheets of cover material are molded in a molding apparatus.

27. The sports ball of claim 26 wherein said first and second cover panels blanks are cut from said first and second continuous sheets of cover material, respectively.

28. The sports ball of claim 18 wherein said first cover portion is bonded to said second cover portion along overlapping sections between said cover portions.

29. The sports ball of claim 18 wherein said panels of each of said first and second cover panel blanks are curved to have a radius of curvature of said sports ball.

* * * * *